US011252980B2

(12) United States Patent
Piel et al.

(10) Patent No.: US 11,252,980 B2
(45) Date of Patent: Feb. 22, 2022

(54) SELF-OSCILLATING DEFROSTING APPARATUS AND METHODS OF THEIR OPERATION

(71) Applicant: NXP USA, Inc., Austin, TX (US)

(72) Inventors: Pierre Marie Jean Piel, Chandler, AZ (US); Lionel Mongin, Chandler, AZ (US); Jérémie Simon, Saint Thomas (FR)

(73) Assignee: NXP USA, Inc., Austin, TX (US)

( * ) Notice: Subject to any disclaimer, the term of this patent is extended or adjusted under 35 U.S.C. 154(b) by 268 days.

(21) Appl. No.: 16/570,069

(22) Filed: Sep. 13, 2019

(65) Prior Publication Data

US 2020/0085084 A1 Mar. 19, 2020

(30) Foreign Application Priority Data

Sep. 18, 2018 (EP) .................................. 18306213

(51) Int. Cl.
*H05B 6/54* (2006.01)
*A23L 3/365* (2006.01)
*A23L 3/01* (2006.01)
*H02M 3/338* (2006.01)
*H05B 6/48* (2006.01)

(52) U.S. Cl.
CPC .............. *A23L 3/365* (2013.01); *A23L 3/01* (2013.01); *H02M 3/338* (2013.01); *H05B 6/48* (2013.01)

(58) Field of Classification Search
CPC ............ A23L 3/005; A23L 3/01; A23L 3/365; H02M 7/4818; H02M 7/5383; H02M 3/338; Y02B 70/10; H05B 6/1245; H05B 6/48; H05B 6/50; H05B 6/62; H05B 6/664; H05B 6/645; H05B 6/6467; H05B 6/688; H05B 6/705; H05B 6/72
USPC ................. 219/702–704, 770, 771, 778–780
See application file for complete search history.

(56) References Cited

U.S. PATENT DOCUMENTS

| 3,394,007 | A | 7/1968 | Campbell |
| 4,837,772 | A | 6/1989 | Laakmann |
| 2018/0042074 | A1 | 2/2018 | Qiu et al. |

FOREIGN PATENT DOCUMENTS

| CN | 106288626 | * | 1/2017 | |
| CN | 106288626 | A | 1/2017 | |
| EP | 3280225 | A1 * | 2/2018 | ............ H05B 6/705 |
| JP | 57-80692 | A | 5/1982 | |
| JP | 5780692 | B2 * | 5/1982 | |
| JP | 57-189490 | A | 11/1982 | |
| JP | 58-93187 | A * | 6/1983 | |

(Continued)

*Primary Examiner* — Hung D Nguyen

(57) ABSTRACT

A thermal increase system includes a cavity, a first electrode disposed in the cavity, a second electrode disposed in the cavity, and a self-oscillator circuit that produces a radio frequency signal that is converted into electromagnetic energy that is radiated into the cavity by the first and second electrodes. The self-oscillating circuit includes the first electrode and the second electrode. In an embodiment, the first electrode is a first plate in a capacitor structure and the second electrode is a second plate in the capacitor structure. The cavity and a load contained within the cavity operates as a capacitor dielectric of the capacitor structure. A resonant frequency of the self-oscillator circuit is at least partially determined by a capacitance value of the capacitor structure.

15 Claims, 9 Drawing Sheets

(56) References Cited

FOREIGN PATENT DOCUMENTS

| | | | |
|---|---|---|---|
| JP | 58-93187 A | | 6/1983 |
| JP | 2002-246164 A | * | 8/2002 |

* cited by examiner

SELF-OSCILLATING DEFROSTING APPARATUS AND METHODS OF THEIR OPERATION

CROSS-REFERENCE TO RELATED APPLICATIONS

This application claims the priority under 35 U.S.C. § 119 of European patent application no. 18306213.2, filed Sep. 18, 2018 the contents of which are incorporated by reference herein.

TECHNICAL FIELD

Embodiments of the subject matter described herein relate generally to apparatus and methods of defrosting a load using radio frequency (RF) energy.

BACKGROUND

Conventional capacitive food defrosting (or thawing) systems include large planar electrodes contained within a heating compartment. After a food load is placed between the electrodes and the electrodes are brought into contact with the food load, low power electromagnetic energy is supplied to the electrodes to provide gentle warming of the food load. As the food load thaws during the defrosting operation, the impedance of the food load changes. Accordingly, the power transfer to the food load also changes during the defrosting operation. The duration of the defrosting operation may be determined, for example, based on the weight of the food load, and a timer may be used to control cessation of the operation.

Although good defrosting results are possible using such systems, the dynamic changes to the food load impedance may result in inefficient defrosting of the food load. What are needed are apparatus and methods for defrosting food loads (or other types of loads) that may result in efficient and even defrosting throughout the load.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of the subject matter described herein relate to solid-state defrosting apparatus that may be incorporated into stand-alone appliances or into other systems. As described in greater detail below, embodiments of solid-state defrosting apparatus include both "unbalanced" defrosting apparatus and "balanced" apparatus. For example, exemplary "unbalanced" defrosting systems are realized using a first electrode disposed in a cavity and configured to receive and radiate an RF signal, and a grounded second electrode disposed in the cavity. In contrast, exemplary "balanced" defrosting systems are realized using first and second electrodes disposed in a cavity, where the first and second electrodes receive and radiate a balanced RF signal.

Generally, the term "defrosting" means to elevate the temperature of a frozen load (e.g., a food load or other type of load) to a temperature at which the load is no longer frozen (e.g., a temperature at or near 0 degrees Celsius). As used herein, the term "defrosting" more broadly means a process by which the thermal energy or temperature of a load (e.g., a food load or other type of load) is increased through provision of RF power to the load. Accordingly, in various embodiments, a "defrosting operation" may be performed on a load with any initial temperature (e.g., any initial temperature above or below 0 degrees Celsius), and the defrosting operation may be ceased at any final temperature that is higher than the initial temperature (e.g., including final temperatures that are above or below 0 degrees Celsius). That said, the "defrosting operations" and "defrosting systems" described herein alternatively may be referred to as "thermal increase operations" and "thermal increase systems." The term "defrosting" should not be construed to limit application of the invention to methods or systems that are only capable of raising the temperature of a frozen load to a temperature at or near 0 degrees Celsius.

Figure 1:
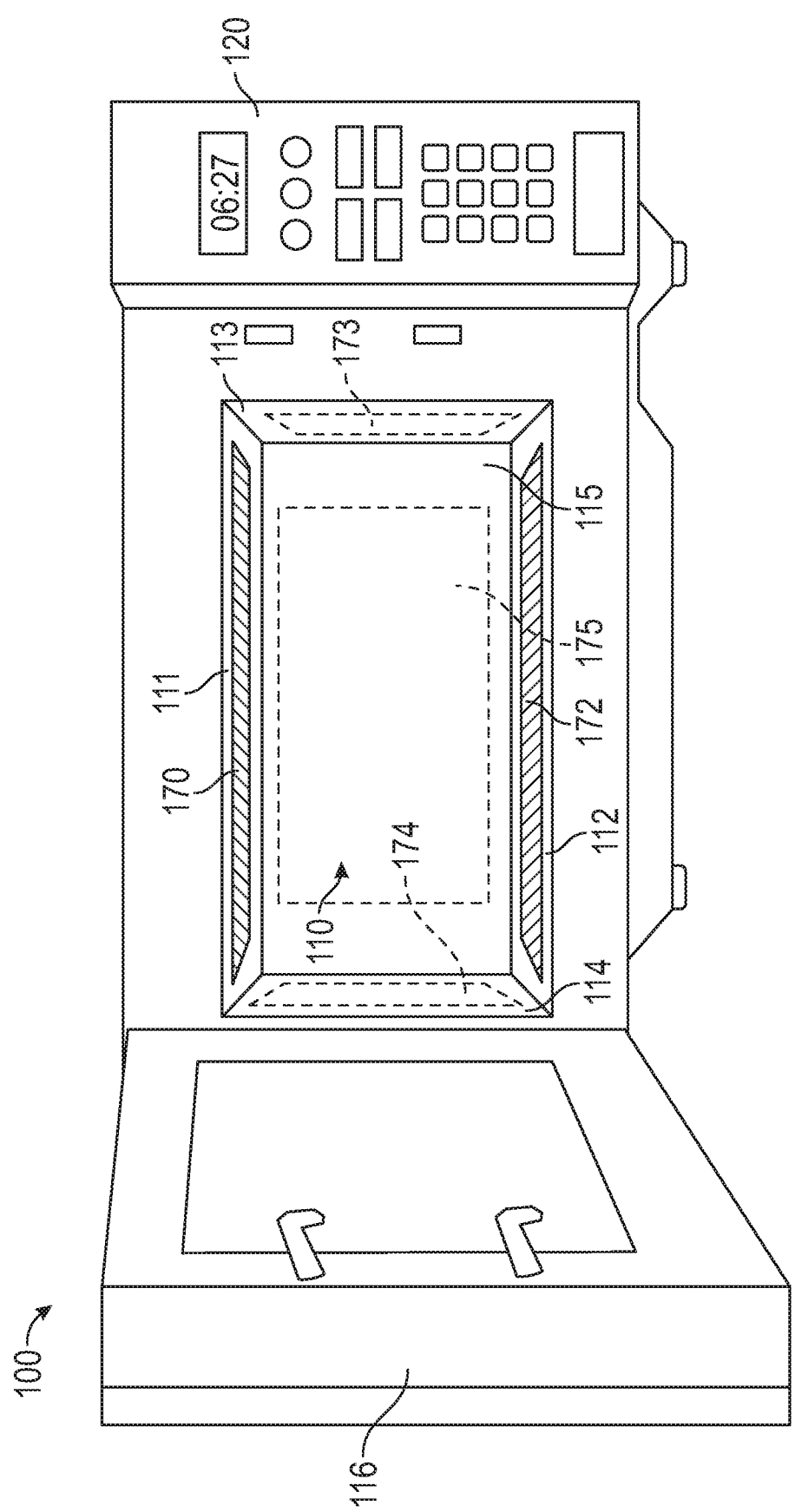
FIG. 1 is a perspective view of a defrosting appliance, in accordance with an example embodiment.

FIG. 1 is a perspective view of a defrosting system 100, in accordance with an example embodiment. Defrosting system 100 includes a defrosting cavity 110 (e.g., cavity 360, 660, FIGS. 3, 6), a control panel 120, one or more radio frequency (RF) signal sources (e.g., RF signal source 320, 620, FIGS. 3, 6), a power supply (e.g., power supply 326, 626, FIGS. 3, 6), a first electrode 170 (e.g., electrode 340, 640, FIGS. 3, 6), a second electrode 172 (e.g., electrode 650, FIG. 6), and a system controller (e.g., system controller 312, 612, FIGS. 3, 6). The defrosting cavity 110 is defined by interior surfaces of top, bottom, side, and back cavity walls 111, 112, 113, 114, 115 and an interior surface of door 116. With door 116 closed, the defrosting cavity 110 defines an enclosed air cavity. As used herein, the term "air cavity" may mean an enclosed area or volume that contains air or other gasses (e.g., defrosting cavity 110).

According to an "unbalanced" embodiment, the first electrode 170 is arranged proximate to a cavity wall (e.g., top wall 111), the first electrode 170 is electrically isolated from the remaining cavity walls (e.g., walls 112-115 and door 116), and the remaining cavity walls are grounded. In such a configuration, the system may be simplistically modeled as a capacitor, where the first electrode 170 functions as one conductive plate (or electrode), the grounded cavity walls (e.g., walls 112-115) function as a second conductive plate (or electrode), and the air cavity (including any load contained therein) functions as a dielectric medium between the first and second conductive plates. Although not shown in FIG. 1, a non-electrically conductive barrier (e.g., barrier 362, 662, FIGS. 3, 6) also may be included in the system 100, and the non-conductive barrier may function to electrically and physically isolate the load from the bottom cavity wall 112. Although FIG. 1 shows the first electrode 170 being proximate to the top wall 111, the first electrode 170 alternatively may be proximate to any of the other walls 112-115, as indicated by alternative electrodes 172-175.

According to a "balanced" embodiment, the first electrode 170 is arranged proximate to a first cavity wall (e.g., top wall 111), a second electrode 172 is arranged proximate to an opposite, second cavity wall (e.g., bottom wall 112), and the first and second electrodes 170, 172 are electrically isolated from the remaining cavity walls (e.g., walls 113-115 and door 116). In such a configuration, the system also may be simplistically modeled as a capacitor, where the first electrode 170 functions as one conductive plate (or electrode), the second electrode 172 functions as a second conductive plate (or electrode), and the air cavity (including any load contained therein) functions as a dielectric medium between the first and second conductive plates. Although not shown in FIG. 1, a non-electrically conductive barrier (e.g., barrier 662, FIG. 6) also may be included in the system 100, and the non-conductive barrier may function to electrically and physically isolate the load from the second electrode 172 and the bottom cavity wall 112. Although FIG. 1 shows the first electrode 170 being proximate to the top wall 111, and the second electrode 172 being proximate to the bottom wall 112, the first and second electrodes 170, 172 alternatively may be proximate to other opposite walls (e.g., the first electrode may be electrode 173 proximate to wall 113, and the second electrode may be electrode 174 proximate to wall 114).

According to an embodiment, during operation of the defrosting system 100, a user (not illustrated) may place one or more loads (e.g., food and/or liquids) into the defrosting cavity 110, and optionally may provide inputs via the control panel 120 that specify characteristics of the load(s). For example, the specified characteristics may include an approximate weight of the load. In addition, the specified load characteristics may indicate the material(s) from which the load is formed (e.g., meat, bread, liquid). In alternate embodiments, the load characteristics may be obtained in some other way, such as by scanning a barcode on the load packaging or receiving a radio frequency identification (RFID) signal from an RFID tag on or embedded within the load. Either way, as will be described in more detail later, information regarding such load characteristics can enable the system controller to control the RF heating process.

To begin the defrosting operation, the user may provide an input via the control panel 120. In response, the system controller causes the RF signal source(s) (e.g., RF signal source 320, 620, FIGS. 3, 6) to supply an RF signal to the first electrode 170 in an unbalanced embodiment, or to both the first and second electrodes 170, 172 in a balanced embodiment, and the electrode(s) responsively radiate electromagnetic energy into the defrosting cavity 110. The electromagnetic energy increases the thermal energy of the load (i.e., the electromagnetic energy causes the load to warm up).

During the defrosting operation, the impedance of the load (and thus the total input impedance of the cavity 110 plus load) changes as the thermal energy of the load increases. The impedance changes alter the absorption of RF energy into the load.

As used herein, the term "tank circuit" refers to an electrical circuit that uses magnetic resonance to store an electrical charge and produce an output signal having an electromagnetic frequency. Typically, a tank circuit includes an inductive coil or inductor connected in parallel with a capacitor. The inductance value of the inductor and the capacitance value of the capacitor determine the frequency of oscillations produced by the tank circuit.

According to an embodiment, the RF signal source (e.g., RF signal source 320, 620, FIGS. 3, 6) is implemented using a self-oscillating circuit configured to oscillate (and thereby generate an output RF signal) at a frequency that is at least partially determined by the impedance of the load. Specifically, and as described herein, a tank circuit of an oscillator incorporated into the RF signal source incorporates the impedance of the cavity 110 plus load. As such, during operation of the defrosting system 100 and even as the impedance of the load changes over time, the output frequency of the oscillator changes so as to always be outputting a signal that is at a resonant frequency of the tank circuit that incorporates the cavity 110 plus load. By operating at the resonant frequency, the RF signal generated by the RF signal source enables a maximum transfer of RF energy into the load, even as the load defrosts and changes impedance. In this manner, the RF signal source of the present defrosting system 100 is self-tuning to optimize power transfer into the load.

Figure 2:
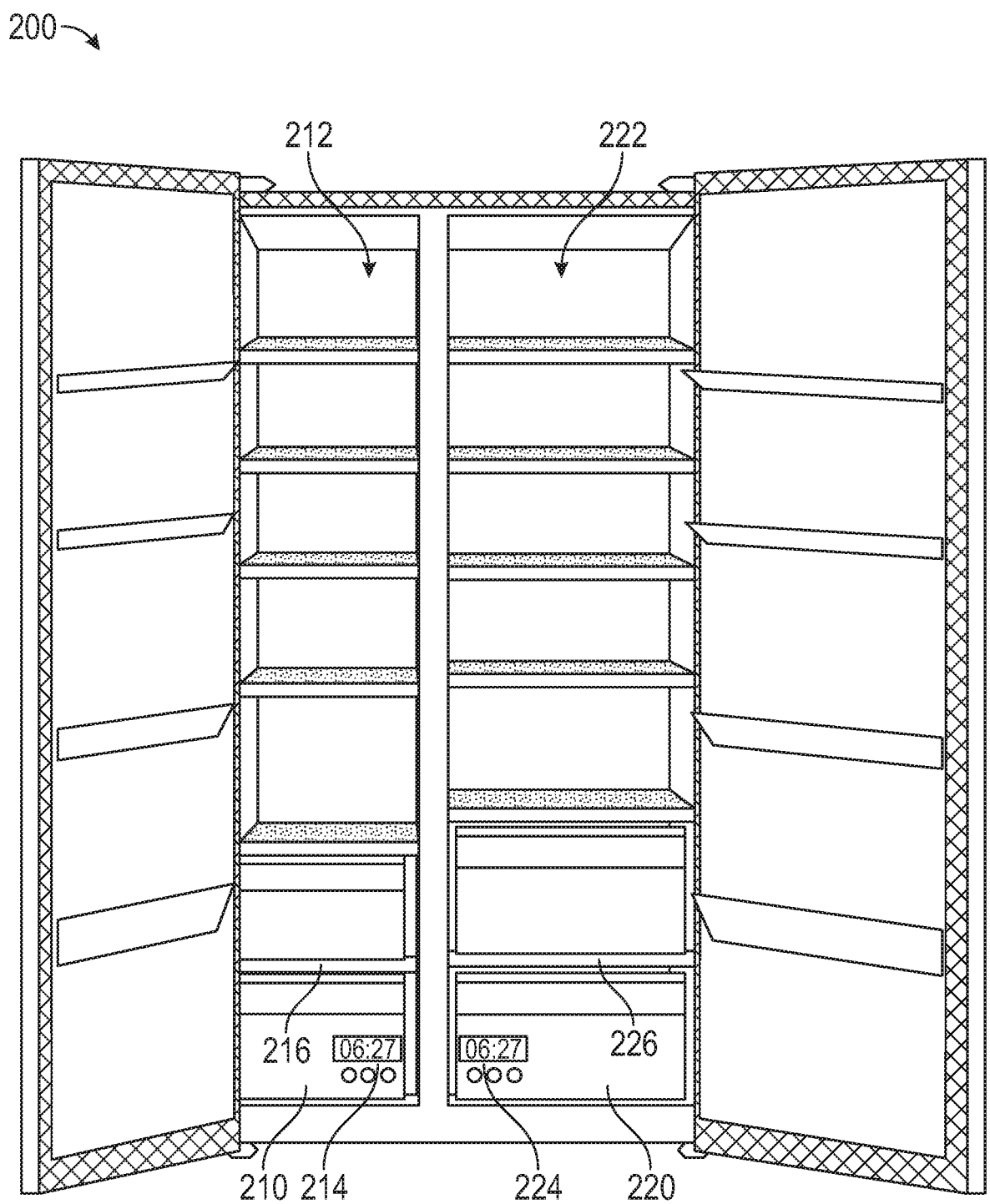
FIG. 2 is a perspective view of a refrigerator/freezer appliance that includes other example embodiments of defrosting systems.

The defrosting system 100 of FIG. 1 is embodied as a counter-top type of appliance. In a further embodiment, the defrosting system 100 also may include components and functionality for performing microwave cooking operations. Alternatively, components of a defrosting system may be incorporated into other types of systems or appliances. For example, FIG. 2 is a perspective view of a refrigerator/freezer appliance 200 that includes other example embodiments of defrosting systems 210, 220. More specifically, defrosting system 210 is shown to be incorporated within a freezer compartment 212 of the system 200, and defrosting system 220 is shown to be incorporated within a refrigerator compartment 222 of the system. An actual refrigerator/freezer appliance likely would include only one of the defrosting systems 210, 220, but both are shown in FIG. 2 to concisely convey both embodiments.

Figure 3:
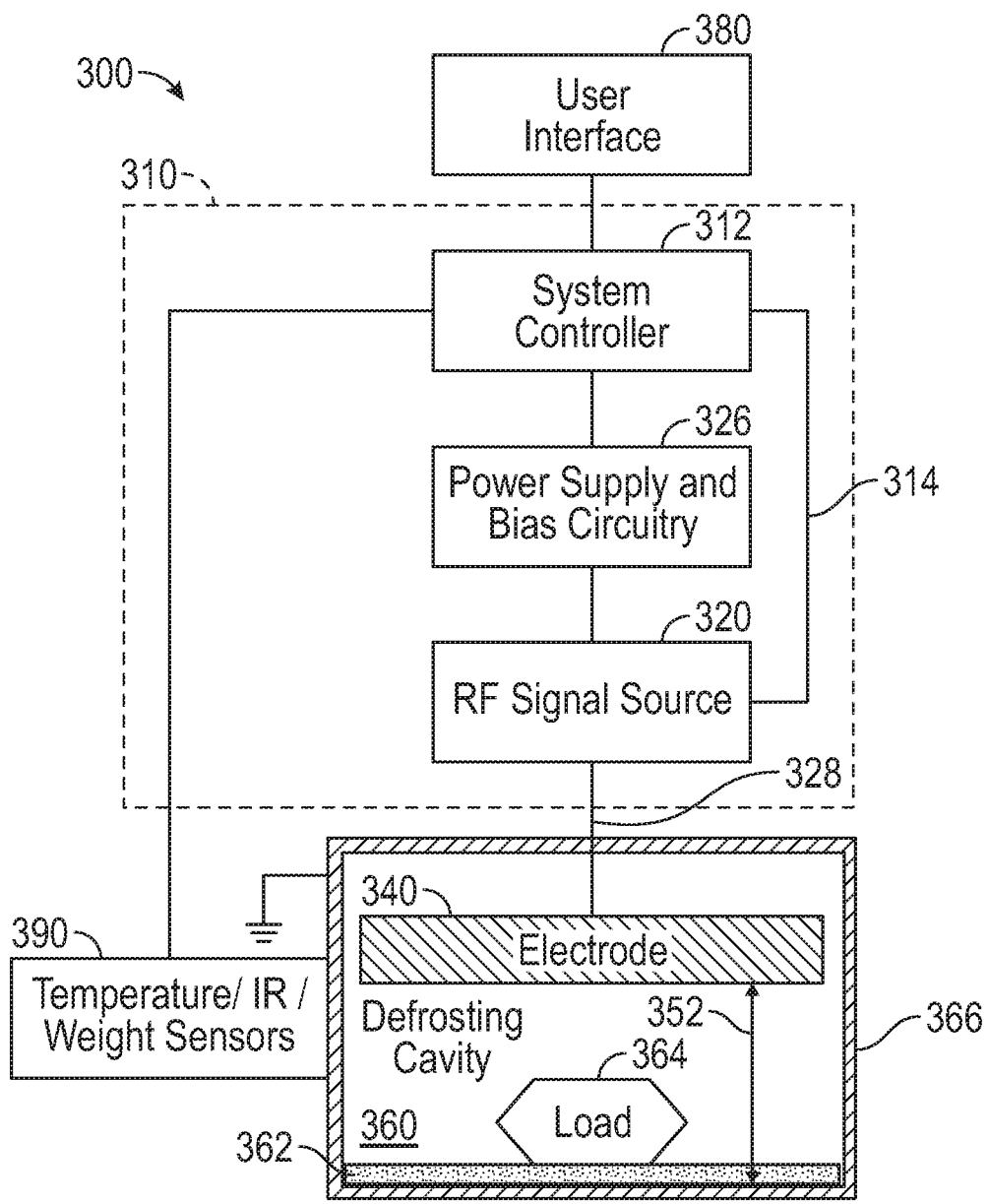
FIG. 3 is a simplified block diagram of an unbalanced defrosting apparatus, in accordance with an example embodiment.
Figure 6:
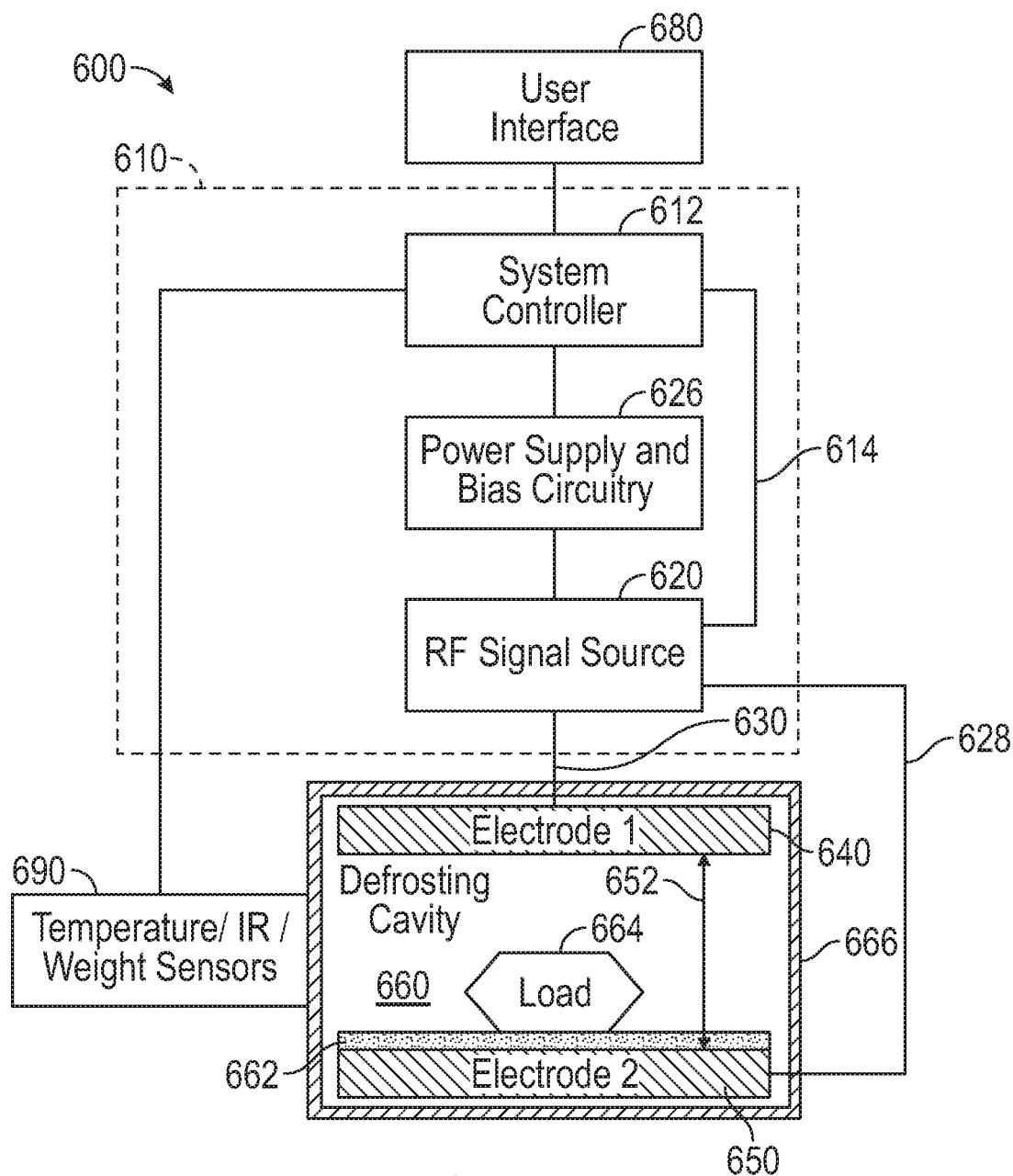
FIG. 6 is a simplified block diagram of a balanced defrosting apparatus, in accordance with another example embodiment.

Similar to the defrosting system 100, each of defrosting systems 210, 220 includes a defrosting cavity, a control panel 214, 224, one or more RF signal sources (e.g., RF signal source 320, 620, FIGS. 3, 6), a power supply (e.g., power supply 326, 626, FIGS. 3, 6), a first electrode (e.g., electrode 340, 640, FIGS. 3, 6), a second electrode 172 (e.g., containment structure 366, electrode 650, FIGS. 3, 6), and a system controller (e.g., system controller 312, 612, FIGS. 3, 6). For example, the defrosting cavity may be defined by interior surfaces of bottom, side, front, and back walls of a drawer, and an interior top surface of a fixed shelf 216, 226 under which the drawer slides. With the drawer slid fully under the shelf, the drawer and shelf define the cavity as an enclosed air cavity. The components and functionalities of the defrosting systems 210, 220 may be substantially the same as the components and functionalities of defrosting system 100, in various embodiments.

In addition, according to an embodiment, each of the defrosting systems 210, 220 may have sufficient thermal communication with the freezer or refrigerator compartment 212, 222, respectively, in which the system 210, 220 is disposed. In such an embodiment, after completion of a defrosting operation, the load may be maintained at a safe temperature (i.e., a temperature at which food spoilage is prevented) until the load is removed from the system 210, 220. More specifically, upon completion of a defrosting operation by the freezer-based defrosting system 210, the cavity within which the defrosted load is contained may thermally communicate with the freezer compartment 212, and if the load is not promptly removed from the cavity, the load may re-freeze. Similarly, upon completion of a defrosting operation by the refrigerator-based defrosting system 220, the cavity within which the defrosted load is contained may thermally communicate with the refrigerator compartment 222, and if the load is not promptly removed from the cavity, the load may be maintained in a defrosted state at the ambient temperature within the refrigerator compartment 222.

Those of skill in the art would understand, based on the description herein, that embodiments of defrosting systems may be incorporated into systems or appliances having other configurations, as well. Accordingly, the above-described implementations of defrosting systems in a stand-alone appliance, a microwave oven appliance, a freezer, and a refrigerator are not meant to limit use of the embodiments only to those types of systems.

Although defrosting systems 100, 200 are shown with their components in particular relative orientations with respect to one another, it should be understood that the various components may be oriented differently, as well. In addition, the physical configurations of the various components may be different. For example, control panels 120, 214, 224 may have more, fewer, or different user interface elements, and/or the user interface elements may be differently arranged. In addition, although a substantially cubic defrosting cavity 110 is illustrated in FIG. 1, it should be understood that a defrosting cavity may have a different shape, in other embodiments (e.g., cylindrical, and so on). Further, defrosting systems 100, 210, 220 may include additional components (e.g., a fan, a stationary or rotating plate, a tray, an electrical cord, and so on) that are not specifically depicted in FIGS. 1, 2.

FIG. 3 is a simplified block diagram of an unbalanced defrosting system 300 (e.g., defrosting system 100, 210, 220, FIGS. 1, 2), in accordance with an example embodiment. Defrosting system 300 includes RF subsystem 310, defrosting cavity 360, user interface 380, system controller 312, RF signal source 320, power supply and bias circuitry 326, electrode 340, and containment structure 366, in an embodiment. In addition, in other embodiments, defrosting system 300 may include temperature sensor(s), infrared (IR) sensor(s), and/or weight sensor(s) 390, although some or all of these sensor components may be excluded. It should be understood that FIG. 3 is a simplified representation of a defrosting system 300 for purposes of explanation and ease of description, and that practical embodiments may include other devices and components to provide additional functions and features, and/or the defrosting system 300 may be part of a larger electrical system.

User interface 380 may correspond to a control panel (e.g., control panel 120, 214, 224, FIGS. 1, 2), for example, that enables a user to provide inputs to the defrosting system 300 regarding parameters for a defrosting operation (e.g., characteristics of the load to be defrosted, and so on), start and cancel buttons, mechanical controls (e.g., a door/drawer open latch), and so on. In addition, the user interface may be configured to provide user-perceptible outputs indicating the status of a defrosting operation (e.g., a countdown timer, visible indicia indicating progress or completion of the defrosting operation, and/or audible tones indicating completion of the defrosting operation) and other information.

Some embodiments of defrosting system 300 may include temperature sensor(s), IR sensor(s), and/or weight sensor(s) 390. The temperature sensor(s) and/or IR sensor(s) may be positioned in locations that enable the temperature of a load 364 within the cavity 360 to be sensed during the defrosting operation. When provided to the system controller 312, the temperature information may enable the system controller 312 to alter the power of the RF signal supplied by the RF signal source 320 (e.g., by controlling the bias and/or supply voltages provided by the power supply and bias circuitry 326), and/or to determine when the defrosting operation should be terminated. The weight sensor(s) may be positioned under the load 364, and are configured to provide an estimate of the weight of the load 364 to the system controller 312. The system controller 312 may use this information, for example, to determine a desired power level for the RF signal supplied by the RF signal source 320, and/or to determine an approximate duration for the defrosting operation.

The RF subsystem 310 includes a system controller 312, an RF signal source 320, and power supply and bias circuitry 326, in an embodiment. System controller 312 may include one or more general purpose or special purpose processors (e.g., a microprocessor, microcontroller, Application Specific Integrated Circuit (ASIC), and so on), volatile and/or non-volatile memory (e.g., Random Access Memory (RAM), Read Only Memory (ROM), flash, various registers, and so on), one or more communication busses, and other components. According to an embodiment, system controller 312 is coupled to user interface 380, RF signal source 320, power supply and bias circuitry 326, and sensors 390 (if included). System controller 312 can provide control signals to the power supply and bias circuitry 326 and to the RF signal source 320.

Defrosting cavity 360 includes a capacitive defrosting arrangement with first and second parallel plate electrodes that are separated by an air cavity within which a load 364 to be defrosted may be placed. For example, a first electrode 340 may be positioned on one side of (e.g., above) the air cavity, and a second electrode may be provided by a portion of a containment structure 366 (or by a second, grounded electrode, not illustrated). More specifically, the containment structure 366 may include bottom, top, and side walls, that may include a portion of a door or hatch for containment structure 366, the interior surfaces of which define the cavity 360 (e.g., cavity 110, FIG. 1). According to an embodiment, the cavity 360 may be sealed (e.g., with a door 116, FIG. 1 or by sliding a drawer closed under a shelf 216, 226, FIG. 2) to contain the electromagnetic energy that is introduced into the cavity 360 during a defrosting operation. The system 300 may include one or more interlock mechanisms that ensure that the seal is intact during a defrosting operation. If one or more of the interlock mechanisms indicates that the seal is breached, the system controller 312 may cease the defrosting operation. According to an embodiment, the containment structure 366 is at least partially formed from conductive material, and the conductive portion(s) of the containment structure 366 may be grounded. Alternatively, at least the portion of the containment structure 366 that corresponds to a cavity surface on an opposite side of the cavity 360 from the electrode 340 (e.g., the bottom surface of the cavity 360) may be formed from conductive material and grounded. Either way, the containment structure 366 (or at least the portion of the containment structure 366 that is parallel with the first electrode 340) functions as a second electrode of the capacitive defrosting arrangement. To avoid direct contact between the load 364 and the grounded bottom surface of the cavity 360, a non-conductive barrier 362 may be positioned over the bottom surface of the cavity 360.

Essentially, defrosting cavity 360 includes a capacitive defrosting arrangement with first and second parallel plate electrodes 340, 366 that are separated by an air cavity within which a load 364 to be defrosted may be placed. The first electrode 340 is positioned within containment structure 366 to define a distance 352 between the electrode 340 and an opposed surface of the containment structure 366 (e.g., the bottom surface, which functions as a second electrode), where the distance 352 renders the cavity 360 a sub-resonant cavity, in an embodiment.

In various embodiments, the distance 352 is in a range of about 0.10 meters to about 1.0 meter, although the distance may be smaller or larger, as well. According to an embodiment, distance 352 is less than one wavelength of the RF signal produced by the RF subsystem 310. In other words, as mentioned above, the cavity 360 is a sub-resonant cavity. In some embodiments, the distance 352 is less than about half of one wavelength of the RF signal. In other embodiments, the distance 352 is less than about one quarter of one wavelength of the RF signal. In still other embodiments, the distance 352 is less than about one eighth of one wavelength of the RF signal. In still other embodiments, the distance 352 is less than about one 50th of one wavelength of the RF signal. In still other embodiments, the distance 352 is less than about one 100th of one wavelength of the RF signal.

With the operational frequency and the distance 352 between electrode 340 and containment structure 366 being selected to define a sub-resonant interior cavity 360, the first electrode 340 and the containment structure 366 are capacitively coupled. More specifically, the first electrode 340 may be analogized to a first plate of a capacitor, the containment structure 366 may be analogized to a second plate of a capacitor, and the load 364, barrier 362, and air within the cavity 360 may be analogized to a capacitor dielectric. Accordingly, the first electrode 340 alternatively may be referred to herein as an "anode," and the containment structure 366 may alternatively be referred to herein as a "cathode."

Essentially, the alternating voltage across the first electrode 340 and the containment structure 366 associated with the RF signal heats the load 364 within the cavity 360. According to various embodiments, the RF subsystem 310 is configured to generate the RF signal to produce voltages between the electrode 340 and the containment structure 366 in a range of about 90 volts to about 3,000 volts, in one embodiment, or in a range of about 3000 volts to about 10,000 volts, in another embodiment, although the system may be configured to produce lower or higher voltages between the electrode 340 and the containment structure 366, as well.

The first electrode 340 is electrically coupled to the RF signal source 320 via a conductive transmission path 328. According to an embodiment, the conductive transmission path 328 is an "unbalanced" path, which is configured to carry an unbalanced RF signal (i.e., a single RF signal referenced against ground). In some embodiments, one or more connectors (not shown, but each having male and female connector portions) may be electrically coupled along the transmission path 328, and a portion of the transmission path 328 between the connectors may comprise a coaxial cable or other suitable connector.

In response to control signals provided by system controller 312 over connection 314, RF signal source 320 is configured to produce an oscillating electrical signal. The RF signal source 320 may be controlled to produce oscillating signals of different power levels and/or different frequencies, in various embodiments. For example, the RF signal source 320 may produce a signal that oscillates in a range of about 10.0 megahertz (MHz) to about 100 MHz, and/or from about 100 MHz to about 3.0 gigahertz (GHz).

In the embodiment of FIG. 3, the RF signal source 320 may include a single amplifier stage or multiple amplifier stages, such as a driver amplifier stage and a final amplifier stage, to generate an amplified output signal on transmission path 328. For example, the output signal of the RF signal source 320 may have a power level in a range of about 100 watts to about 400 watts or more.

The gain applied by the power amplifier may be controlled using gate bias voltages and/or drain supply voltages provided by the power supply and bias circuitry 326 to the one or more amplifier stages. More specifically, power supply and bias circuitry 326 provides bias and supply voltages to each RF amplifier stage in accordance with control signals received from system controller 312.

In an embodiment, each amplifier within RF signal source 320 includes a laterally diffused metal oxide semiconductor FET (LDMOSFET) transistor. However, it should be noted that the transistors are not intended to be limited to any particular semiconductor technology, and in other embodiments, one or more transistors may be realized as a gallium nitride (GaN) transistor, another type of MOSFET transistor, a bipolar junction transistor (BJT), or a transistor utilizing another semiconductor technology.

Defrosting cavity 360 and any load 364 (e.g., food, liquids, and so on) positioned in the defrosting cavity 360 present a cumulative load for the electromagnetic energy (or RF power) that is radiated into the cavity 360 by the first electrode 340. More specifically, the cavity 360 and the load 364 present an impedance to the system, referred to herein as a "cavity input impedance." The cavity input impedance changes during a defrosting operation as the temperature of the load 364 increases.

Within the defrosting system 300, the RF signal source 320 is implemented using a self-oscillating and self-stabilizing circuit configured to oscillate (and thereby generate an output RF signal) at a frequency that is at least partially determined by the impedance of the load. The impedance associated with the combination of cavity 360 and any load 364 (i.e., the cavity input impedance) forms a portion of a tank or resonant circuit that defines the resonant frequency of the oscillator of the RF signal source 320. As such, during operation of the defrosting system 300 and even as the impedance of the load 364 changes over time, the output frequency of the oscillator (and, specifically, the output frequency of RF signal source 320) changes or adjusts automatically, without user input, so that the RF signal source 320 dynamically is outputting a signal that is at a resonant frequency of the tank circuit that includes the impedance associated with the cavity 360 plus load 364. By operating at the changing resonant frequency of the tank circuit, the RF signal source 320 may produce an RF signal that achieves the maximum transfer of RF energy into the load 364, even as the load 364 defrosts and the impedance of the load 364 plus cavity 360 changes. In this manner, the RF signal source 320 is constantly self-tuning to optimize power transfer into the load 364.

In an embodiment, the RF signal source 320 includes a self-tuning oscillator, such as a Colpitts oscillator, which relies upon a combination of inductors and capacitors arranged in a tank circuit to set the oscillation frequency of the self-tuning oscillator. For example, various embodiments of a Colpitts oscillator incorporate tank circuits having two capacitors connected in parallel, in which a first terminal of the first of the two capacitors is connected to a ground node and a second terminal of the second of the two capacitors is connected to an inductor. This arrangement forms an LC resonant circuit. As described below, in an embodiment of RF signal source 320, the self-tuning oscillator is configured so that one of the capacitors of the tank circuit is provided by a capacitive structure that includes the electrode(s) and the cavity 360 (plus load) of the defrosting system 300. Although a specific example configuration is described (namely including a Colpitts oscillator), it should be understood that the RF signal source 320 may be implemented using other types of self-tuning oscillators, where the oscillator uses a combination of capacitors and other circuit components to establish an oscillation frequency at a resonant frequency of the circuit. In such circuits, one or more of the capacitors in the respective tank circuit(s) may be implemented as the capacitive structure of the electrode(s) plus cavity 360 (and load) of the defrosting system 300 in the manner described herein.

Figure 9A:
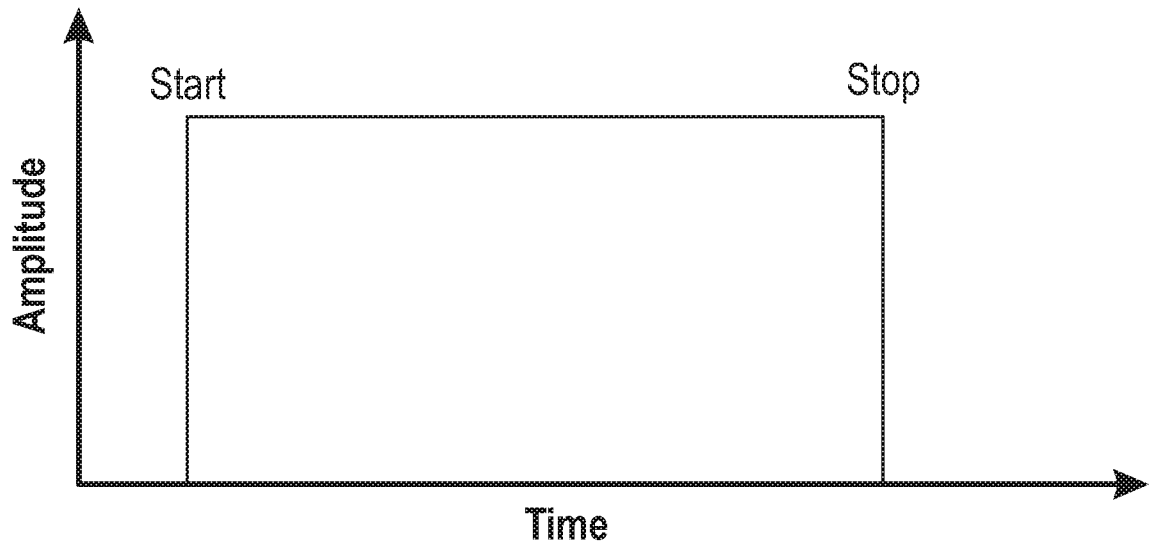
FIGS. 9A-9D are graphs depicting waveforms representing output voltages of the power supply and bias circuitry of the defrosting system.

Electrical power is supplied to the RF signal source 320 by the power supply and bias circuitry 326. Power supply and bias circuitry 326 generally outputs a direct current (DC) voltage to the RF signal source 320, where the DC voltage may be in the range of 0 volts to about 65 volts or more. The magnitude of the DC voltage outputted by power supply and bias circuitry 326 may be set or determined by system controller 312. For example, based upon inputs received from the user interface 380 and/or the sensors 390, system controller 312 may select an appropriate output voltage for power supply and bias circuitry 326. The output voltage may be greater, for example, for loads 364 having a greater weight than for loads that weigh less. Based upon the various inputs, the system controller 312 may utilize a look-up table to determine a suitable output voltage for power supply and bias circuitry 326. In some embodiments, the output voltage of the power supply and bias circuitry 326 may be constant through the defrosting or heating process. FIG. 9A is a graph depicting a waveform that represents a possible output of the power supply and bias circuitry 326 during a defrosting process. As illustrated, the output voltage is constant for the entire heating process.

In some other embodiments, the system controller 312 may cause the output voltage of power supply and bias circuitry 326 to vary throughout a defrosting process for a particular load 364. In some cases, the output voltage may vary continuously over time during the defrosting or heating process. Such variability can enable control over the heating processes, for example, by more rapidly heating or defrosting the load during an initial or middle part of the defrosting or heating process, and then at the end of the process reducing the output voltage to, in turn, reduce the amount of energy delivered to the load. This can enable more even heating or defrosting of the load by providing a low energy end stage to the heating or defrosting process that more effectively allows heat energy to be distributed through the food. To illustrate, 9B is a graph depicting a waveform that represents a possible output of the power supply and bias circuitry 326 during a defrosting process, where the output voltage is not constant and may vary continuously over the heating or defrosting process.

Figure 9B:
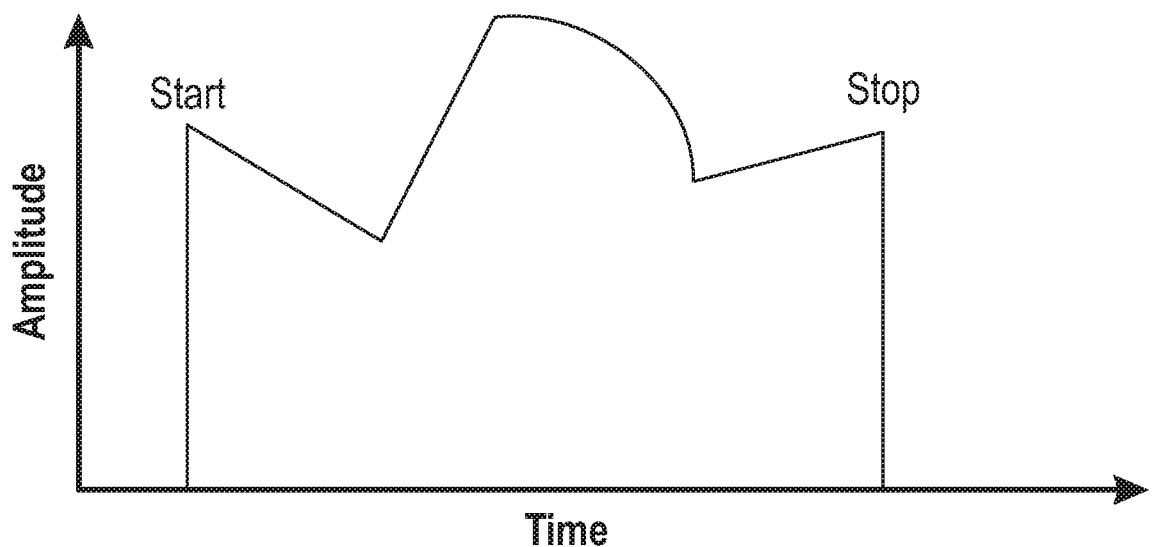
Figure 9C:
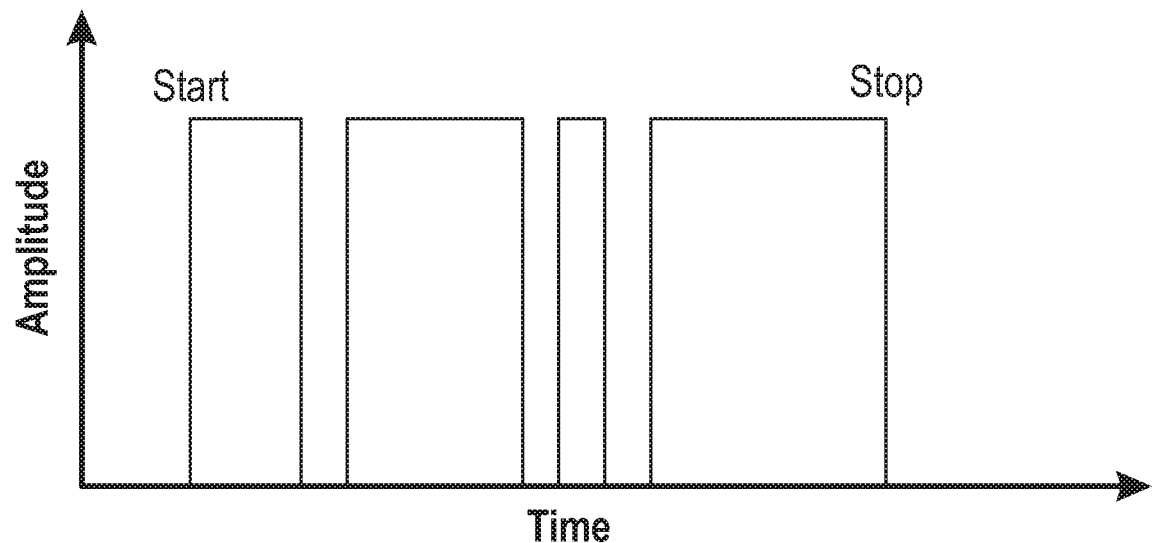

To achieve the different output DC voltages of power supply and bias circuitry 326, the power supply and bias circuitry 326 may be configured to be a variable power supply capable of generating and outputting a range of different output voltages. In other embodiments, the power supply and bias circuitry 326 may be configured to generate a pulse-width modulated output signal having a fixed amplitude but a variable duty cycle or a variable amplitude but fixed pulse-width, or combinations of both. In that case, the defrosting system 300 may incorporate a pulse-width modulation circuit configured to modulate the output voltage into pulsed output voltages (e.g., voltages ranging from 0 volts to 65 volts) that may be utilized to operate the RF signal source 320 to generate output RF energy and implement the functionality of the defrosting system 300. A pulse-width modulation circuit generates a fixed output DC voltage. By switching the circuit's control transistor or switch on or off, the circuit will either output its DC voltage (if the transistor is turned on) or zero voltage (if the transistor is turned off). Accordingly, by switching the transistor on or off, the circuit outputs a series of pulses, where each pulse has the circuit's DC voltage. Energy regulation is then achieved by varying the amount of the time the transistor is in the on state versus the on state. This time period is referred to as the power supply's duty cycle and is expressed as a percentage of on time over a particular time period or interval. By adjusting the duty cycle through the defrosting or heating process, a variable amount of energy can be delivered into the load throughout the process. FIG. 9C is a graph depicting a waveform that represents a possible output of the power supply and bias circuitry 326 during a defrosting process. As illustrated, the output voltage is formed as a series of pulses having a constant DC voltage. By adjusting the number of pulses and the duration of each pulse, the amount of energy delivered into the load by the defrosting or heating process can be fine-tuned and control to achieve a desired state of the load.

Figure 9D:
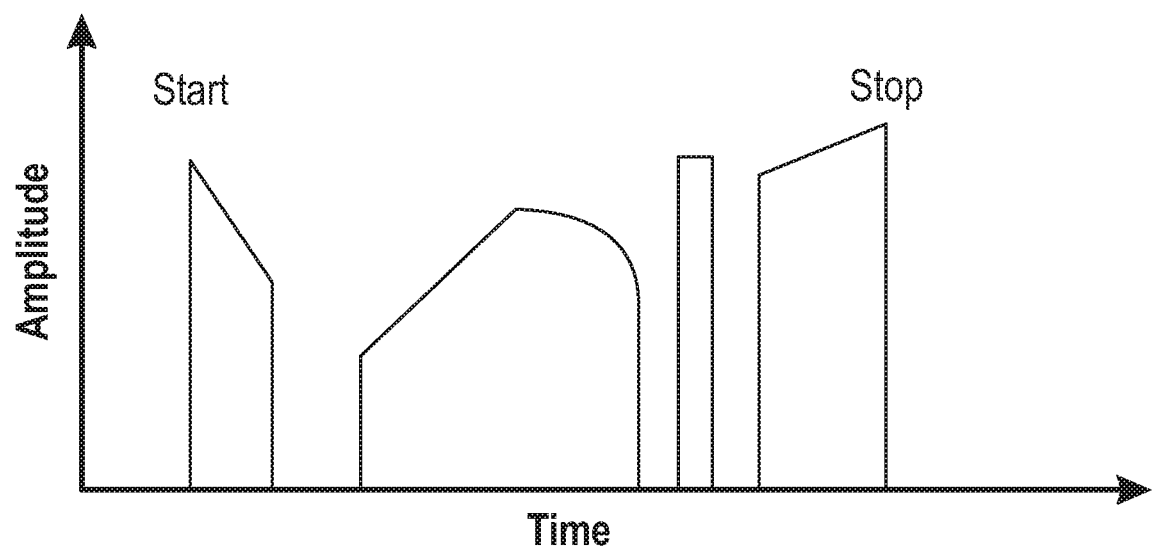

In still other embodiments, the power supply and bias circuitry 326 may be configured to generate a pulse-width modulated output signal having a variable amplitude. In that case, the defrosting system 300 may incorporate a pulse-width modulation circuit configured to modulate the output voltage into pulsed, variable output voltages (e.g., voltages ranging from 0 volts to 65 volts) that may be utilized to operate the RF signal source 320 to generate output RF energy and implement the functionality of the defrosting system 300. A pulse-width modulation circuit generates a variable output DC voltage. By controlling the output voltage of the power supply and bias circuitry 326 and switching the circuit's control transistor or switch on or off, the circuit will either a selected DC voltage (if the transistor is turned on) or zero voltage (if the transistor is turned off). Accordingly, by switching the transistor on or off, the circuit outputs a series of pulses, where each pulse has a designated and potentially variable DC voltage. Energy regulation is then achieved by both varying the output voltage of the power supply and bias circuitry 326 and the amount of the time the transistor is in the on state versus the on state. FIG. 9D is a graph depicting a waveform that represents a possible output of the power supply and bias circuitry 326 during a defrosting process. As illustrated, the output voltage is formed as a series of pulses having variable voltages. By adjusting the output voltage as well as the number of pulses and the duration of each pulse, the amount of energy delivered into the load by the defrosting or heating process can be fine-tuned and controlled to achieve a desired state of the load.

As described above, the RF signal source 320 is implemented using a self-oscillating circuit that is configured to generate an oscillating output signal in response to the application of a DC input voltage. The circuit is self-tuning in that the circuit is configured to generate an output signal having the resonant frequency of the tank circuit (or resonant circuit) of the self-oscillating circuit. It should be noted that, in some cases, the actual frequency of the output signal of the self-oscillating circuit may only be approximately equal to the resonant frequency of the tank or resonant circuit because parasitic losses within the circuit may cause the output frequency to be slightly reduced. For example, the frequency of the output signal may be between about 95 percent and 105 percent of the resonant frequency of the tank circuit (or resonant circuit).

Figure 4:
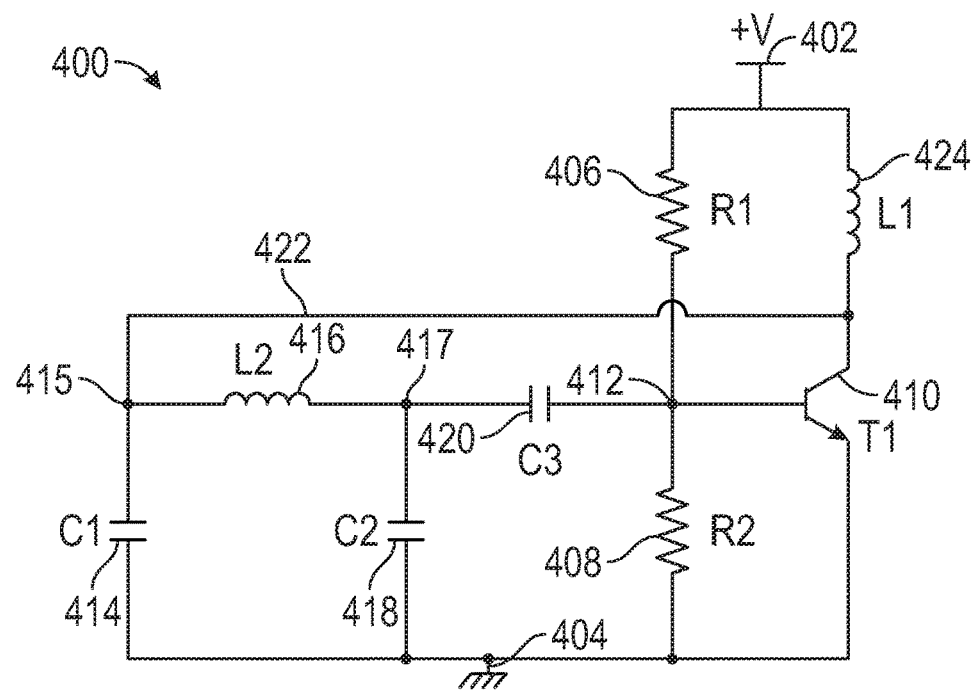
FIG. 4 is a schematic depicting an example self-tuning and self-oscillating circuit that may be incorporated into an embodiment of a defrosting apparatus.

FIG. 4 is a schematic depicting an example self-tuning and self-oscillating circuit that may be incorporated into an embodiment of an unbalanced defrosting system (e.g., system 300, FIG. 3). Self-oscillator circuit 400 includes a positive input voltage node 402 and a reference or ground node 404. Resistors 406, 408 are coupled in series between positive input voltage node 402 and ground node 404. As such, resistors 406, 408 operate as a voltage divider so that the voltage at node 412 disposed between resistors 406, 408 is a fraction of the voltage at positive input voltage node 402. The fraction is determined by the relative resistance values of resistors 406, 408.

Self-oscillator circuit 400 includes transistor 410 (i.e., a gain device). As depicted in FIG. 4, transistor 410 is a bipolar junction transistor (BJT), though in other embodiments of self-oscillator circuit 400, different types of transistors may be utilized. For example, transistor 410 may include a silicon-based, metal oxide semiconductor field effect transistor (MOSFET). It should be noted that the transistor 410 is not intended to be limited to any particular semiconductor technology, and in other embodiments, transistor 410 may be realized as a gallium nitride (GaN) based transistor, another type of field effect transistor (FET), or a transistor utilizing another semiconductor technology.

Node 412 is coupled to a control terminal (e.g., a base terminal for a BJT or gate terminal of a FET) of transistor 410. Typically, the relative resistance values of resistors 406, 408 are selected so that the voltage at node 412 (and, therefore, the voltage applied to the control terminal of transistor 410), which is applied to the control terminal of transistor 410, biases transistor 410 enabling transistor 410 to operate as an amplifier.

Self-oscillator circuit 400 also includes inductor 424 coupled between positive input voltage node 402 and a first current conducting terminal (e.g., a collector terminal of a BJT or a drain terminal of a FET) of transistor 410. The second current conducting terminal (e.g., an emitter terminal of a BJT or a source terminal of a FET) may be coupled to the ground node 404. Inductor 424 operates as an RF inductor choke (i.e., inductor 424 is a high-impedance component at the operating frequency of self-oscillator circuit 400) and, as such, inductor 424 biases the first current conducting terminal of transistor 410.

The oscillating portion of self-oscillator circuit 400 is a tank circuit formed by the combination of capacitor 414, inductor 416, and capacitor 418. In the tank circuit, capacitor 414 has a first terminal (first electrode) coupled to node 415 and a second terminal connected to ground node 404. Inductor 416 has a first terminal coupled to node 415, and a second terminal coupled to node 417. Capacitor 418 has a first terminal coupled to node 417, and a second terminal coupled to ground node 404. In this configuration, the resonant frequency of the tank circuit formed by capacitors 414, 418 and inductor 416 is determined by the following equation (1):

$$f_{resonant} = \frac{1}{2\pi\sqrt{L\frac{(C_1 * C_2)}{(C_1 + C_2)}}} \qquad \text{Equation (1)}$$

where L is equal to the inductance value of inductor 416, $C_1$ is equal to the capacitance value of capacitor 414, and $C_2$ is equal to the capacitance value of capacitor 418.

A feedback loop is established within self-oscillator circuit 400 via connection 422 formed between the first current conducting terminal of transistor 410 and node 415 (or the first terminal of capacitor 414). The first terminal of capacitor 418 is coupled to node 412 through capacitor 420 which is, in turn, coupled to the control terminal of transistor 410. Capacitor 420 has a first terminal coupled to node 417 (or the first terminal of capacitor 418) and a second terminal coupled to node 412, and capacitor 420 operates as a DC block capacitor to isolate the voltage at the first current conducting terminal of transistor 410 from the voltage at the control terminal of transistor 410.

During operation, with an appropriate voltage applied across nodes 402 and 404, transistor 410 is biased by the voltage at node 412. Voltage accumulates across capacitor 414 which dissipates through inductor 416, charging capacitor 418. Capacitors 414 and 418 will then eventually discharge back through inductor 416. The charging and discharging of capacitors 414 and 418 through inductor 416 creates damped oscillations within the tank circuit of self-oscillator circuit 400 resulting in an alternating voltage across capacitor 418. That alternating voltage is then applied to the input or control terminal of transistor 410 through DC-blocking capacitor 420. The alternating voltage is then, in turn, amplified and phase shifted at the output of transistor 410 and, as a result, a stable oscillation is generated at the output of transistor 410 and reapplied to the tank circuit and re-amplified. This process repeats, setting up the oscillation of the self-oscillator circuit 400, which will eventually oscillate at a resonant frequency determined by the values of capacitors 414, 418 and inductor 416 according to equation (1), above. This oscillating signal is, in turn, amplified by transistor 410. That amplified signal is then fed back into capacitor 414 via feedback line 422. As will be explained in more detail in conjunction with FIG. 5, the voltage applied at node 402 may correspond to the voltage supplied by a power supply (e.g., power supply and bias circuitry 326, FIG. 3) to the RF signal source, and the feed back signal on line 422 may correspond to the RF output signal from the RF signal source (e.g., RF signal source 320, FIG. 3), which is applied to the first electrode (e.g., electrode 340, FIG. 3).

Figure 5:
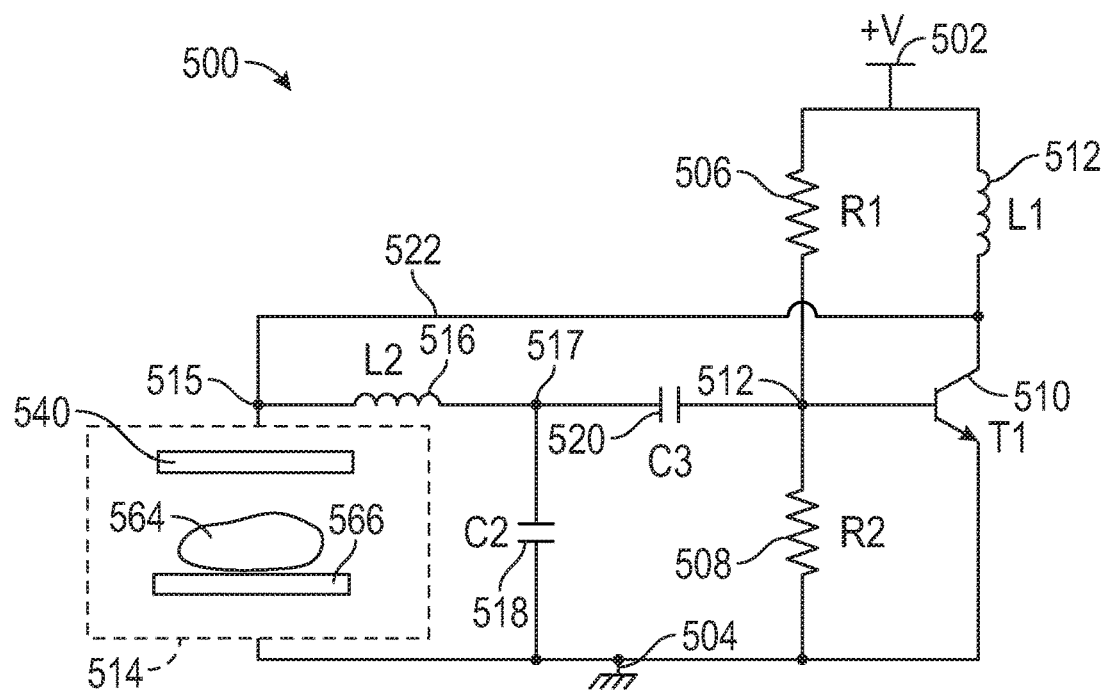
FIG. 5 is a schematic depicting an implementation of a portion of an RF signal source that may be incorporated into an embodiment of a defrosting system.

The self-oscillator circuit design of FIG. 4 may be utilized in accordance with a defrosting system to control the application of RF energy to a load positioned within a defrosting cavity. Specifically, the capacitive structure of the electrodes and defrosting cavity (plus load) may be utilized as one of the capacitors in the tank circuit of the oscillator. As described, below, by incorporating such an oscillator into an RF signal source, energy can be efficiently delivered into a defrosting load. To illustrate, FIG. 5 is a schematic depicting an implementation of a portion of an RF self-oscillator circuit 500 (e.g., RF signal source 320 of FIG. 3) that may be incorporated into a defrosting system (e.g., defrosting system 300 of FIG. 3).

As shown, self-oscillator circuit 500 includes a positive input voltage node 502 and a reference or ground node 504. In this configuration, positive input voltage node 502 may be coupled to a power supply (e.g., power supply and bias circuitry 326 of FIG. 3) to receive a DC voltage therefrom. As discussed previously, the DC voltage may be a variable DC voltage, or may be a pulse-width modulated voltage with a variable duty cycle. Resistors 506, 508 are coupled in series between positive input voltage node 502 and ground node 504. As such, resistors 506, 508 operate as a voltage divider so that the voltage at node 512 disposed between resistors 506, 508 is a fraction of the voltage at positive input voltage node 502. The fraction is determined by the relative resistance values of resistors 506, 508.

Self-oscillator circuit 500 includes transistor 510 (i.e., a gain device). As depicted in FIG. 5, transistor 510 may be a bipolar junction transistor, though in other embodiments of self-oscillator circuit 500, different types of transistors may be utilized. For example, transistor 510 may include a FET, such as a silicon-based, GaN-based, or other type of FET. It should be noted that the transistors are not intended to be limited to any particular semiconductor technology, and in other embodiments, transistor 510 may be realized with another semiconductor technology.

Node 512 is coupled to a control terminal of transistor 510. Typically, the relative resistance values of resistors 506, 508 are selected so that the voltage at node 512 (and, therefore, the voltage applied to the control terminal of transistor 510), which is applied to the control terminal of transistor 510, biases transistor 510 enabling transistor 510 to operate as an amplifier.

Self-oscillator circuit 500 also includes inductor 512 coupled between positive input voltage node 502 and a first current conducting terminal of transistor 510 (e.g., a collector terminal of a BJT or a drain terminal of a FET). The second current conducting terminal (e.g., an emitter terminal of a BJT or a source terminal of a FET) may be coupled to the ground node 504. Inductor 512 operates as an RF inductor choke (i.e., inductor 512 is a high-impedance component at the operating frequency of self-oscillator circuit 500) and, as such, inductor 512 biases the first current conducting terminal (e.g., collector terminal) of transistor 510.

The oscillating portion of self-oscillator circuit 500 is a tank circuit formed by the combination of a capacitor structure 514, inductor 516, and capacitor 518. In the tank circuit, capacitor structure 514 has a first terminal (first electrode) coupled to node 515 and a second terminal coupled to ground node 504. Inductor 516 has a first terminal coupled to node 515, and a second terminal coupled to node 517. Capacitor 518 has a first terminal coupled to node 517, and a second terminal coupled to ground node 504.

According to an embodiment, capacitor structure 514 is, in fact, formed by the structure of the electrodes and the defrosting cavity of the defrosting system. Specifically, a first electrode 540 (e.g., electrode 340 of FIG. 3) of the defrosting system forms a first plate of capacitor structure 514, which is coupled to a first terminal of inductor 516. Similarly, a grounded second electrode or a containment structure 566 (e.g., containment structure 366 of FIG. 3), or at least a portion thereof, of the defrosting system forms a second plate of capacitor structure 514, which is coupled to ground node 504. Load 564 is positioned within the defrosting cavity and forms, in combination with air contained within the defrosting cavity, the dielectric of capacitor structure 514. In this configuration, the resonant frequency of the tank circuit formed by capacitors 514, 518 and inductor 516 may be determined by equation (1), where L is equal to the inductance value of inductor 516, $C_1$ is equal to the capacitance value of capacitor structure 514, and $C_2$ is equal to the capacitance value of capacitor 518.

A feedback loop is established within self-oscillator circuit 500 by connection 522 between the input terminal (e.g., collector terminal) of transistor 510 and the first terminal (e.g., electrode 540) of capacitor structure 514. For example, connection 522 may correspond to connection 328 in FIG. 3. The first terminal of capacitor 518 is coupled through capacitor 520 to node 512 which is, in turn, coupled to the control terminal of transistor 510. Capacitor 520 has a first terminal coupled to node 517 (or the first terminal of capacitor 518) and a second terminal coupled to node 512, and capacitor 520 operates as a DC block capacitor to isolate the voltage at the first current conducting terminal of transistor 510 from the voltage at the control terminal of transistor 510.

During operation, with an appropriate voltage applied across nodes 502 and 504 (e.g., by power supply and bias circuitry 326 of FIG. 3), transistor 510 is biased by the voltage at node 512. Voltage accumulates across the defrosting cavity of capacitor structure 514 and capacitor 518 which discharges through inductor 516. The charging and discharging of capacitor structure 514 and capacitor 518 through inductor 516 create damped oscillations in the tank circuit of self-oscillator circuit 500 resulting in an alternating voltage across capacitor 518. That alternating voltage is, in turn, applied to the input of transistor 510 through DC blocking capacitor 520 and, as a result, a stable oscillation is generated at the output of transistor 520 and reapplied to the tank circuit and re-amplified. This process repeats, setting up the oscillation of self-oscillator circuit 500, which will eventually oscillate at the resonant frequency determined by the values of capacitors 514, 518 and inductor 516. This oscillating signal is, in turn, amplified by transistor 510. That amplified signal is then fed back into the defrosting cavity of capacitor structure 514 via feedback line 522.

In this manner, the oscillating signal generated by self-oscillator circuit 500 is fed into the defrosting cavity of capacitor structure 514. More specifically, the oscillating signal is provided to electrode 540, which converts the oscillating signal into an electromagnetic signal that is radiated into containment structure 566. The electromagnetic signal produced from the oscillating signal is at least partially absorbed by the load 564 in the defrosting cavity, which results in warming or defrosting of the load 564.

In an example application of self-oscillator circuit 500, the voltage applied at terminal 502 may be in the range of 10 V to 100 V, inductor 512 may have an inductance in the range of 1 microHenry (uH) to 20 uH, resistor 506 may have a resistance in the range of 10,000 Ohm to 15,000 Ohm, resistor 508 may have a resistance in the range of 200 Ohm to 800 Ohm, capacitor 514 may have a capacitance in the range of 50 picofarads (pF) to 200 pF, inductor 516 may have an inductance in the rage of 500 nH to 2,000 nH, capacitor 518 may have a capacitance in the range of 10 pF to 50 pF, capacitor 520 may have a capacitance in the range of 1 nF to 10 nF. In such a configuration, the operating frequency of self-oscillator circuit 500 may range from 10 MHz to 50 MHz.

As the load 564 warms and defrosts, the impedance of the load 564 changes, which changes the capacitance value of the capacitor structure 514 formed by the electrode 540 and the defrosting cavity in combination with the load 564. In response to the changing capacitance value of capacitor structure 514, the resonant frequency of the signal generated by self-oscillator circuit 500 will change according to equation (1), above. During operation, self-oscillator circuit 500 will adapt its frequency of operation so that the output signal (i.e., the signal across capacitor structure 514) has a frequency equal to the resonant frequency of the tank circuit including capacitors 514, 518 and inductor 516. The resonant frequency results in a maximum voltage across the defrosting cavity of capacitor structure 514 which, in turn, results in the maximum energy transfer into load 564, even as the impedance of the defrosting cavity (plus load) changes over time.

In this example, self-oscillator circuit 500 is depicted with a particular circuit configured to provide the self-oscillating function described herein. But it should be understood that other circuit configurations may be utilized that provide similar functionality to that of the circuit depicted in FIG. 5. Specifically, the circuit depicted in FIG. 5 may be modified in accordance with other self-oscillator circuit designs in which the self-oscillator circuit includes a tank circuit, where the impedance of the cavity (plus load) of a defrosting system may be incorporated into the tank circuit.

FIGS. 3 and 5, and the related discussion, describe an "unbalanced" defrosting apparatus, in which an RF signal is applied to one electrode (e.g., electrode 340, FIG. 3), and the other "electrode" (e.g., a second electrode or a portion of the containment structure 366, FIG. 3) is grounded. As mentioned above, an alternate embodiment of a defrosting apparatus comprises a "balanced" defrosting apparatus. In such an apparatus, balanced RF signals are provided to both electrodes.

For example, FIG. 6 is a simplified block diagram of a balanced defrosting system 600 (e.g., defrosting system 100, 210, 220, FIGS. 1, 2), in accordance with an example embodiment. Defrosting system 600 includes RF subsystem 610, defrosting cavity 660, user interface 680, system controller 612, RF signal source 620, power supply and bias circuitry 626, and two electrodes 640, 650, in an embodiment. In addition, in other embodiments, defrosting system 900 may include temperature sensor(s), IR sensor(s), and/or weight sensor(s) 690, although some or all of these sensor components may be excluded. It should be understood that FIG. 6 is a simplified representation of defrosting system 600 for purposes of explanation and ease of description, and that practical embodiments may include other devices and components to provide additional functions and features, and/or the defrosting system 600 may be part of a larger electrical system.

User interface 680 may correspond to a control panel (e.g., control panel 120, 214, 224, FIGS. 1, 2), for example, which enables a user to provide inputs to the system regarding parameters for a defrosting operation (e.g., characteristics of the load to be defrosted, and so on), start and cancel buttons, mechanical controls (e.g., a door/drawer open latch), and so on. In addition, the user interface may be configured to provide user-perceptible outputs indicating the status of a defrosting operation (e.g., a countdown timer, visible indicia indicating progress or completion of the defrosting operation, and/or audible tones indicating completion of the defrosting operation) and other information.

The RF subsystem 610 includes a system controller 612, an RF signal source 620, and power supply and bias circuitry 626, in an embodiment. System controller 612 may include one or more general purpose or special purpose processors (e.g., a microprocessor, microcontroller, ASIC, and so on), volatile and/or non-volatile memory (e.g., RAM, ROM, flash, various registers, and so on), one or more communication busses, and other components. According to an embodiment, system controller 612 is operatively and communicatively coupled to user interface 680, RF signal source 620, power supply and bias circuitry 626, and sensors 690 (if included). System controller 612 is configured to receive signals indicating user inputs received via user interface 680 and sensor(s) 690. Responsive to the received signals, system controller 612 provides control signals to the power supply and bias circuitry 626 and/or to the RF signal source 620.

Defrosting cavity 660 includes a capacitive defrosting arrangement with first and second parallel plate electrodes 640, 650 that are separated by an air cavity within which a load 664 to be defrosted may be placed. Within a containment structure 666, first and second electrodes 640, 650 (e.g., electrodes 140, 150, FIG. 1) are positioned in a fixed physical relationship with respect to each other on opposite sides of an interior defrosting cavity 660.

The first and second electrodes 640, 650 are separated across the cavity 660 by a distance 652. In various embodiments, the distance 652 is in a range of about 0.10 meters to about 1.0 meter, although the distance may be smaller or larger, as well. According to an embodiment, a distance 652 between the electrodes 640, 650 is less than one wavelength of the RF signal produced by the RF subsystem 610. In other words, the cavity 660 may be a sub-resonant cavity. In some embodiments, the distance 652 is less than about half of one wavelength of the RF signal. In other embodiments, the distance 652 is less than about one quarter of one wavelength of the RF signal. In still other embodiments, the distance 652 is less than about one eighth of one wavelength of the RF signal. In still other embodiments, the distance 652 is less than about one 50th of one wavelength of the RF signal. In still other embodiments, the distance 652 is less than about one 100th of one wavelength of the RF signal.

With the operational frequency and the distance 652 between electrodes 640, 650 being selected to define a sub-resonant interior cavity 660, the first and second electrodes 640, 650 are capacitively coupled. More specifically, the first electrode 640 may be analogized to a first plate of a capacitor, the second electrode 650 may be analogized to a second plate of a capacitor, and the load 664, barrier 662, and air within the cavity 660 may be analogized to a capacitor dielectric. Accordingly, the first electrode 640 alternatively may be referred to herein as an "anode," and the second electrode 650 may alternatively be referred to herein as a "cathode."

An output of the RF subsystem 610, and more particularly a double-ended, balanced output of RF signal source 620, is electrically coupled to electrodes 640, 650 via conductive paths 630, 628, respectively. Essentially, the alternating voltage across the first and second electrodes 640, 650 associated with the RF signal heats the load 664 within the cavity 660. According to various embodiments, the RF subsystem 610 is configured to generate the RF signal to produce voltages across the electrodes 640, 650 in a range of about 90 volts to about 3000 volts, in one embodiment, or in a range of about 3000 volts to about 10,000 volts, in another embodiment, although the system may be configured to produce lower or higher voltages across electrodes 640, 650, as well.

In response to control signals provided by system controller 612 over connection 614, RF signal source 620 is configured to produce a double-ended, balanced oscillating electrical signal. The RF signal source 620 may be controlled to produce oscillating signals of different power levels and/or different frequencies, in various embodiments. For example, the RF signal source 620 may produce a signal that oscillates in a range of about 10.0 MHz to about 100 MHz and/or from about 100 MHz to about 3.0 GHz.

In the embodiment of FIG. 6, the RF signal source 620 may include a single amplifier stage or multiple amplifier stages, such as a driver amplifier stage and a final amplifier stage, to generate an amplified, balanced output signal on transmission paths 628, 630. For example, the output signal of the RF signal source 620 may have a power level in a range of about 100 watts to about 400 watts or more.

The gain applied by the power amplifier(s) may be controlled using gate bias voltages and/or drain supply voltages provided by the power supply and bias circuitry 626 to each amplifier stage. More specifically, power supply and bias circuitry 626 provides bias and supply voltages to each RF amplifier stage in accordance with control signals received from system controller 312.

In an embodiment, each amplifier within RF signal source 620 includes an LDMOSFET transistor. However, RF signal source 620 may include transistors of different designs not limited to any particular semiconductor technology. Such transistors may include, for example, FETs, silicon-based or GaN-based transistors, other types of MOSFETs, BJTs, or transistors utilizing another semiconductor technology.

Defrosting cavity 660 and any load 664 (e.g., food, liquids, and so on) positioned in the defrosting cavity 660 present a cumulative load for the electromagnetic energy (or RF power) that is radiated into the cavity 660 by the electrodes 640, 650. More specifically, the cavity 660 and the load 664 present an impedance to the system, referred to as a cavity input impedance. The cavity input impedance changes during a defrosting operation as the temperature of the load 664 increases.

Within the defrosting system 600, the RF signal source 620 is implemented using a self-oscillating circuit configured to oscillate (and thereby generate an output RF signal) at a frequency that is at least partially determined by the impedance of the load 664. The impedance associated with the combination of cavity 660 and any load 664 (i.e., the cavity input impedance) forms a portion of a tank or resonant circuit that defines a resonant frequency of an oscillator of the RF signal source 620. As such, during operation of the defrosting system 600 and even as the impedance of the load 664 changes over time, the output frequency of the oscillator (and, specifically, the output frequency of RF signal source 620) changes automatically and without user input so that the RF signal source 620 dynamically is outputting a signal that is at a resonant frequency of the tank circuit that includes the impedance associated with the cavity 660 plus load 664. Operation at the resonant frequency ensures the maximum transfer of RF energy into the load, even as the load 664 defrosts and the impedance of the load 664 plus cavity 660 changes. In this manner, the RF signal source 620 is self-tuning to optimize power transfer into the load 664.

In an embodiment, the RF signal source 660 includes a self-tuning oscillator, such as a Colpitts oscillator, which relies upon a combination of inductors and capacitors arranged in a tank circuit to set the oscillation frequency of the oscillator. As described below, in an embodiment of RF signal source 660, the self-tuning oscillator is configured so that one of the capacitors of the tank circuit is provided by a capacitive structure that includes the electrodes 640, 650 and the cavity 660 (plus load) of the defrosting system 600. Although a specific example configuration is described (namely including a Colpitts oscillator), it should be understood that the RF signal source 620 may be implemented using other types of self-tuning oscillators, where the oscillator uses a combination of capacitors and other circuit components to establish an oscillation frequency at a resonant frequency of the circuit. In such circuits, one or more of the capacitors in the respective tank circuit(s) may be implemented as the capacitive structure of the electrodes 640, 650 plus cavity 660 (and load) of the defrosting system 600 in the manner described herein.

Electrical power is supplied to the RF signal source 620 by the power supply and bias circuitry 626. Power supply and bias circuitry 626 generally outputs a DC voltage to the RF signal source 620, where the DC voltage may be in the range of 0 volts to about 65 volts or more. The magnitude of the DC voltage outputted by power supply and bias circuitry 626 may be set or determined by system controller 612. For example, based upon inputs received from the user interface 680 and/or the sensors 690, system controller 612 may select an appropriate output voltage for power supply and bias circuitry 626. The output voltage may be greater, for example, for loads 664 having a greater weight than for loads that weigh less. Based upon the various inputs, the system controller 612 may utilize a look-up table to determine a suitable output voltage for power supply and bias circuitry 626. During the defrosting process, the power supply and bias circuitry 626 may be configured to output a constant DC voltage through the defrosting process (see FIG. 9A for an example). In some embodiments, the system controller 612 may cause the output voltage of power supply and bias circuitry 626 to vary throughout a defrosting process for a particular load 664. An example of such an output voltage is depicted in FIG. 9B and may enable more fine-tuned control over the defrosting process, as described above.

To achieve the different output DC voltages of power supply and bias circuitry 626, the power supply and bias circuitry 626 may be configured to be a variable power supply capable of generating and outputting a range of different output voltages throughout a defrosting or heating process. In other embodiments, the power supply and bias circuitry 626 may be configured to generate a pulse-width modulated output signal having a fixed amplitude but a variable duty cycle or a variable amplitude but fixed pulse-width, or combinations of both. In that case, the defrosting system 600 may incorporate a pulse-width modulation circuit configured to modulate the output voltage into pulsed output voltages (e.g., voltages ranging from 0 volts to 65 volts) that may be utilized to operate the RF signal source 620 to generate output RF energy and implement the functionality of the defrosting system 600. An example pulse-width modulated output voltage is depicted in FIG. 9C.

In still other embodiments, the power supply and bias circuitry 626 may be configured to generate a pulse-width modulated output signal having a variable amplitude. In that case, the defrosting system 600 may incorporate a pulse-width modulation circuit configured to modulate the output voltage into pulsed, variable output voltages (e.g., voltages ranging from 0 volts to 65 volts) that may be utilized to operate the RF signal source 620 to generate output RF energy and implement the functionality of the defrosting system 600. FIG. 9D is a graph depicting an example output voltage formed as a series of pulses having variable voltages. By adjusting the output voltage as well as the number of pulses and the duration of each pulse, the amount of energy delivered into the load by the defrosting or heating process can be fine-tuned and controlled to achieve a desired state of the load.

As described above, the RF signal source 620 is implemented using a self-oscillating circuit that is configured to generate an oscillating output signal in response to the application of a DC input voltage. The circuit is self-tuning in that the circuit is configured to generate an output signal having the resonant frequency of the tank circuit (or resonant circuit) of the self-oscillating circuit. It should be noted that, in some cases, the actual frequency of the output signal of the self-oscillating circuit may be approximately equal to the resonant frequency of the tank or resonant circuit because parasitic losses within the circuit may cause the output frequency to be slightly reduced. For example, the frequency of the output signal may be between about 95 percent and 105 percent of the resonant frequency of the tank circuit (or resonant circuit).

Figure 7:
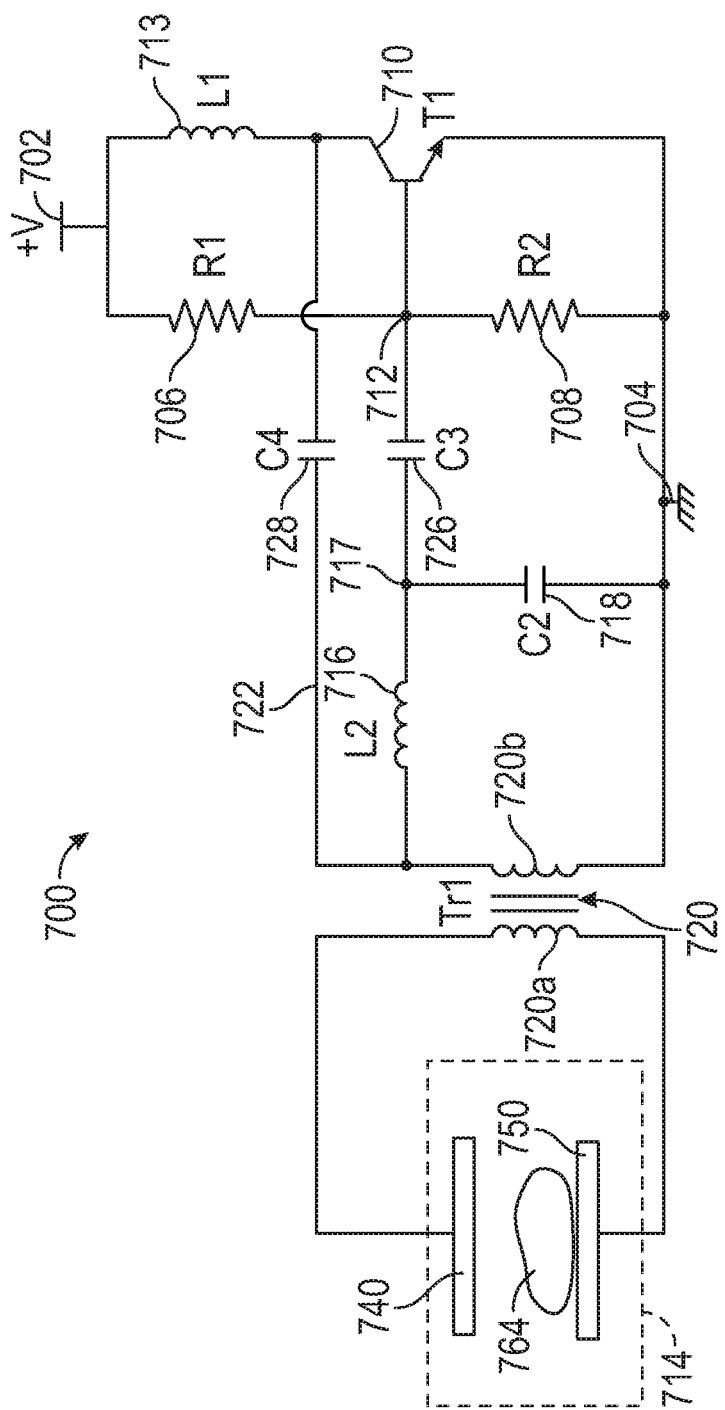
FIG. 7 is a schematic depicting an implementation of a portion of an RF signal source that may be incorporated into an embodiment of a balanced defrosting system.

To illustrate, FIG. 7 is a schematic depicting an implementation of a portion of self-tuning and self-oscillating circuit 700 that may be incorporated into an embodiment of a balanced defrosting system (e.g., defrosting system 600 of FIG. 6). As shown, self-oscillator circuit 700 includes a positive input voltage node 702 and a reference or ground node 704. In this configuration, positive input voltage node 702 may be coupled to a power supply (e.g., power supply and bias circuitry 626 of FIG. 6) to receive a DC voltage therefrom. Resistors 706, 708 are coupled in series between positive input voltage node 702 and ground node 704. As such, resistors 706, 708 operate as a voltage divider so that the voltage at node 712 disposed between resistors 706, 708 is a fraction of the voltage at positive input voltage node 702. The fraction is determined by the relative resistance values of resistors 706, 708.

Self-oscillator circuit 700 includes transistor 710 (i.e., a gain device). As depicted in FIG. 7, transistor 710 is a BJT, though in other embodiments of self-oscillator circuit 700, different types of transistors may be utilized. For example, transistor 710 may include a silicon-based MOSFET. It should be noted that the transistors are not intended to be limited to any particular semiconductor technology, and in other embodiments, transistor 710 may be realized as a GaN transistor, another type of field effect transistor, or a transistor utilizing another semiconductor technology.

Node 712 is coupled to a control terminal (e.g., a base terminal or gate terminal) of transistor 710 through capacitor 726. Capacitor 726 is disposed between the first terminal of capacitor 718 and node 712 and operates as a DC block capacitor to isolate the voltage at the input terminal of transistor 710 from the voltage at the control terminal of transistor 710. Typically, the relative resistance values of resistors 706, 708 are selected so that the voltage at node 712 (and, therefore, the voltage applied to the control terminal of transistor 710), which is applied to the control terminal of transistor 710, biases transistor 710 enabling transistor 710 to operate as an amplifier.

Self-oscillator circuit 700 also includes inductor 713 coupled between positive input voltage node 702 and a first current conducting terminal (e.g., a collector terminal of a BJT or a drain terminal of a FET) of transistor 710. The second current conducting terminal (e.g., an emitter terminal of a BJT or a source terminal of a FET) may be coupled to ground node 704. Inductor 713 operates as an RF inductor choke (i.e., inductor 713 is a high-impedance component at the operating frequency of self-oscillator circuit 700) and, as such, inductor 713 biases the first current conducting terminal of transistor 710.

The oscillating portion of self-oscillator circuit 700 is a tank circuit formed by the combination of capacitor structure 714, inductor 716, and capacitor 718. Transformer 720 (or balun) also is incorporated into the tank circuit, where the transformer 720 includes first and second windings 720a, 720b. In the tank circuit, capacitor structure 714 has a first terminal (first electrode) coupled to a first terminal of the first winding 720a, and a second terminal coupled a second terminal of the first winding 720b. Inductor 716 has a first terminal coupled to a first terminal of the second winding 720b, and a second terminal coupled to node 717. Capacitor 718 has a first terminal coupled to node 717, and a second terminal coupled to ground node 704.

In this embodiment, capacitor structure 714 is formed by the structure of the electrodes 740, 750 (e.g., electrodes 640, 650, FIG. 6) and the defrosting cavity (e.g., cavity 660, FIG. 6) plus any load 764 within the cavity. Specifically, a first electrode 740 (e.g., electrode 640 of FIG. 6) of the defrosting cavity forms a first plate of capacitor structure 714. Similarly, a second electrode 750 (e.g., electrode 650 of FIG. 6) of the defrosting cavity forms a second plate of capacitor structure 714. Load 764 is positioned within the defrosting cavity and forms, in combination with air contained within the defrosting cavity, the dielectric of capacitor structure 714. As discussed above, capacitor structure 714 is coupled across a first winding 720a of transformer 720. More specifically, electrode 740 is coupled to a first terminal of winding 720a, and electrode 750 is coupled to a second terminal of winding 720a.

During operation of self-oscillator circuit 700, a signal is conveyed through the second winding 702b of transformer 720. Transformer 720 converts that signal into a balanced signal at the first winding 720a of transformer 720. More specifically, the balanced signal is a double-ended signal for which, at any given time, the signal at the first terminal of winding 720a is about 180 degrees out of phase from the signal at the second terminal of winding 720a. This balanced signal is ultimately applied across electrodes 740, 750 in the cavity of the heating system to transfer energy into load 764. Conversely, as a voltage accumulates across capacitor structure 714 and ultimately flows through inductor 716 into capacitor 718, transformer 720 converts the balanced voltage of capacitor structure 714 into an unbalanced voltage.

In an embodiment, transformer 720 has a winding ratio of about 1:1. In such a configuration, transformer 720 has the same voltage across windings 720a, 720b at any given time. In other embodiments, however, a transformer having a different winding ratio may be used in the place of transformer 720. By adjusting the winding ratio of transformer 720, the impedance of transformer 720 can be adjusted which may, in some cases, help to maximize the energy transfer from the circuit to the load 764. Accordingly, different transformers 720 having different winding ratios could be incorporated into self-oscillator circuit 700 depending upon the capacitance value of the electrodes and heating cavity (plus load) to which the circuit 700 is coupled. Defrosting systems, for example, that utilize multiple heating cavity configurations (e.g., different defrosting drawers of different geometrical configurations), may include self-oscillating circuits configured to utilize different transformers 720 having different winding configurations, where each self-oscillating circuit is configured for a specific heating cavity configuration.

In the configuration of self-oscillating circuit 700 shown in FIG. 7, the resonant frequency of the tank circuit formed by capacitors 714, 718 and inductor 716 is determined by the equation (1), above, where L is equal to the inductance value of inductor 716, $C_1$ is equal to the capacitance value of capacitor structure 714, and $C_2$ is equal to the capacitance value of capacitor 718.

A feedback loop is established within self-oscillator circuit 700 between the first current conducting terminal of transistor 710 and winding 720b of transformer 720. Specifically, the first current conducting terminal of transistor 710 is coupled to a first terminal of capacitor 728, and a second terminal of capacitor 728 is coupled to a first terminal of winding 720b of transformer 720.

During operation, with an appropriate voltage applied across nodes 702 and 704 (e.g., by power supply and bias circuitry 626 of FIG. 6), transistor 710 is biased by the voltage at node 712. Initially, voltage accumulates across the defrosting cavity of capacitor structure 714 which is conveyed through transformer 720, and dissipated through inductor 716, charging capacitor 718. Capacitor 718 will then eventually discharge back through inductor 716 and the second winding 720b of transformer 720, a balanced signal will be generated at the first winding 720a of transformer, and this balanced signal will be converted by electrodes 740, 750 into an electromagnetic signal that is radiated into the defrosting cavity of capacitor structure 714. This process repeats, setting up the oscillation of signal source 700, which will eventually oscillate at the resonant frequency determined by the values of capacitors 714, 718 and inductor 716. This oscillating signal is, in turn, amplified by transistor 710. That amplified signal is then fed back into the defrosting cavity of capacitor structure 714 via feedback line 722.

In this manner, the oscillating signal generated by self-oscillator circuit 700 is converted into electromagnetic energy that is fed into the defrosting cavity of capacitor structure 714 and, specifically, by electrodes 740, 750. The electromagnetic energy generated from the oscillating signal, which may be an RF signal, is at least partially absorbed by the load 764 in the defrosting cavity, which results in warming or defrosting of the load 764.

As the load 764 warms and defrosts, the impedance of the load 764 changes, which changes the capacitance value of the capacitor structure 714 formed by the defrosting cavity in combination with the electrodes 740, 750 and the load 764. In response to the changing capacitance value of capacitor structure 714, the resonant frequency of the signal generated by self-oscillator circuit 700 will change due to the changing capacitance value according to equation (1), above. During operation, self-oscillator circuit 700 will adapt its frequency of operation so that the output signal (i.e., the signal across capacitor structure 714) has a frequency equal to the resonant frequency of the tank circuit including capacitors 714, 718 and inductor 716. The resonant frequency results in maximum a maximum voltage across the defrosting cavity of capacitor structure 714 which, in turn, results in the maximum energy transfer into load 764, even as the impedance of the defrosting cavity changes over time.

Self-oscillator circuit 700 is depicted with a particular circuit configured to provide the self-oscillating function described herein. But it should be understood that other circuit configurations may be utilized that provide similar functionality to that of the circuit depicted in FIG. 7. Specifically, the circuit depicted in FIG. 7 may be modified in accordance with other self-oscillator circuit designs in which the self-oscillator circuit includes a tank circuit, where the impedance of the cavity (plus load) of a defrosting system may be incorporated into the tank circuit.

In various embodiments, the circuitry associated with the RF subsystem (e.g., RF subsystem 310, 610, FIGS. 3, 6) also may be implemented in the form of one or more modules. Such a module may incorporate a ground substrate providing structural support for a printed circuit board (PCB) over which various electrical components of the module may be mounted. According to an embodiment, the PCB houses the circuitry associated with the RF subsystem (e.g., subsystem 310 or 610, FIGS. 3, 6).

Figure 8:
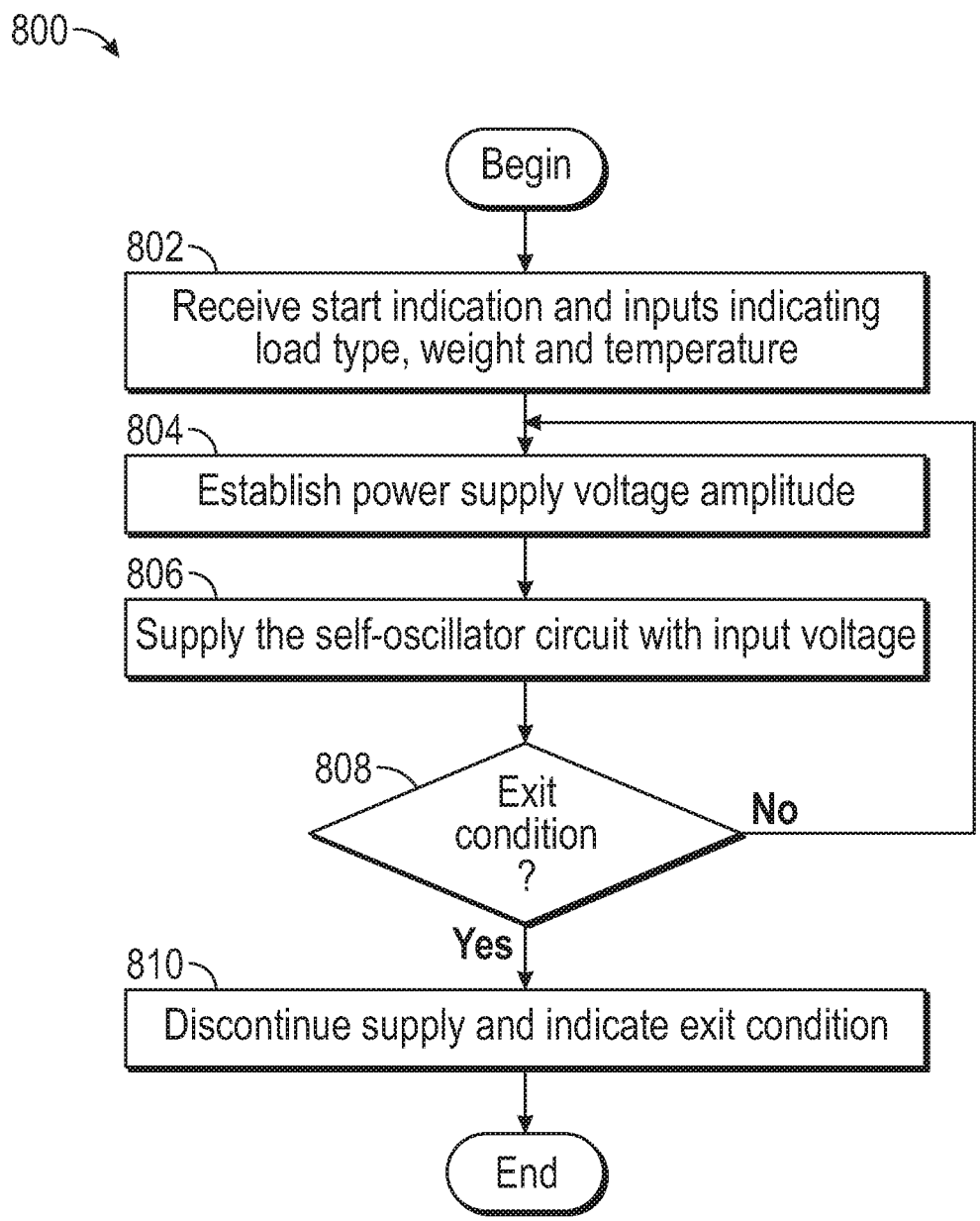
FIG. 8 is a flowchart of a method of operating an embodiment of a defrosting system where the defrosting system includes a self-oscillating signal source.

Now that embodiments of the electrical and physical aspects of defrosting systems have been described, various embodiments of methods for operating such defrosting systems will now be described in conjunction with FIG. 8. More specifically, FIG. 8 is a flowchart of a method of operating a defrosting system (e.g., system 100, 210, 220, 300, 600) where the defrosting system includes a self-oscillating signal source, in accordance with an example embodiment.

The method may begin, in block 802, when the system controller (e.g., system controller 312, 612, FIGS. 3, 6) receives an indication that a defrosting operation should start. Such an indication may be received, for example, after a user has placed a load (e.g., load 364, 664, FIGS. 3, 6) into the system's defrosting cavity (e.g., cavity 360, 660, FIGS. 3, 6), has sealed the cavity (e.g., by closing a door or drawer), and has pressed a start button (e.g., of the user interface 380, 680, FIGS. 3, 6). In an embodiment, sealing of the cavity may engage one or more safety interlock mechanisms.

According to various embodiments, the system controller optionally may receive additional inputs indicating the load type (e.g., meats, liquids, or other materials), the initial load temperature, and/or the load weight. For example, information regarding the load type may be received from the user through interaction with the user interface (e.g., by the user selecting from a list of recognized load types). Alternatively, the system may be configured to scan a barcode visible on the exterior of the load, or to receive an electronic signal from an RFID device on or embedded within the load. Information regarding the initial load temperature may be received, for example, from one or more temperature sensors and/or IR sensors (e.g., sensors 390, 690, FIGS. 3, 6) of the system. Information regarding the load weight may be received from the user through interaction with the user interface, or from a weight sensor (e.g., sensor 390, 690 FIGS. 3, 6) of the system. As indicated above, receipt of inputs indicating the load type, initial load temperature, and/or load weight is optional, and the system alternatively may not receive some or all of these inputs.

In block 804, based upon the data received during step 802, the system controller determines a voltage or voltage signal characteristics (e.g., in the case of a pulse-width modulated (PWM) voltage signal) to be supplied to the system's signal generator by an appropriate power supply (e.g., power supply and bias circuitry 326, 626, FIGS. 3, 6). In various embodiments, a look-up table may be utilized to determine an appropriate voltage or voltage signal characteristics, where particular attributes of a load (e.g., load 764), such as type of food, weight, and/or temperature of the food, can be correlated to particular voltage or voltage attribute values. In some embodiments, a look-up table is utilized to select an initial voltage or voltage signal characteristics to supply to the system's signal generator. As the heating process continues, however, the voltage applied to the system's signal generator may be adjusted to control how much RF energy is generated by the signal generator. Specifically, the voltage applied to the system's signal generator (and, thereby, the energy of the outputted RF signal supplied to the load being heated) can be made variable by adjusting the DC voltage amplitude or the PWM frequency or both of the signal applied to the signal generator. Varying those parameters during the heating process can help to keep the defrosting temperature uniform for delicate loads and also reduce the defrosting timing by applying more RF energy at the beginning of the heating process, and reducing the amount of delivered energy at the end of the heating process to avoid temperature hot spots being generated within the load.

With the desired voltage or voltage signal characteristics determined in step 804, the system controller, in step 806, causes the power supply to supply the desired voltage or voltage signal as an input to the self-oscillator circuit (e.g., circuit 500, 700, FIGS. 5, 7). With the voltage applied to the self-oscillator circuit, the circuit begins to oscillate and generate an RF signal, as described above, at a resonant frequency of a tank circuit within the self-oscillator circuit. That is converted by the electrodes (e.g., electrodes 540, 740, 750, FIGS. 5, 7) into electromagnetic energy that is delivered into the defrosting cavity of the system and, ultimately, into the load placed therein. As the load warms, the impedance of the load changes, and, as described herein, the self-oscillator circuit will adjust the frequency of its output signal (i.e., the signal provided to the electrodes) in response. This may ensure that a maximum amount of RF energy is delivered into the load throughout the defrosting operation.

In step 808, the system controller evaluates whether or not an exit condition has occurred. In actuality, determination of whether an exit condition has occurred may be an interrupt driven process that may occur at any point during the defrosting process. However, for the purposes of including it in the flowchart of FIG. 8, the process is shown to occur after block 806.

In any event, several conditions may warrant cessation of the defrosting operation. For example, the system may determine that an exit condition has occurred when a safety interlock is breached. Alternatively, the system may determine that an exit condition has occurred upon expiration of a timer that was set by the user (e.g., through user interface 380, 680, FIGS. 3, 6) or upon expiration of a timer that was established by the system controller based on the system controller's estimate of how long the defrosting operation should be performed. In still another alternate embodiment, the system may otherwise detect completion of the defrosting operation.

If an exit condition has not occurred, then the defrosting operation may continue by iteratively performing blocks 804, 806, and 808. When an exit condition has occurred, then in block 810, the system controller causes the supply of the RF signal by the self-oscillator circuit to be discontinued. For example, the system controller may disable the RF signal source (e.g., RF signal source 320, 620, FIGS. 3, 6) and/or may cause the power supply and bias circuitry (e.g., circuitry 326, 626, FIGS. 3, 6) to discontinue provision of the supply voltage. In addition, the system controller may send signals to the user interface (e.g., user interface 380, 680, FIGS. 3, 6) that cause the user interface to produce a user-perceptible indicia of the exit condition (e.g., by displaying "door open" or "done" on a display device, or providing an audible tone). The method may then end.

It should be understood that the order of operations associated with the blocks depicted in FIG. 8 corresponds to an example embodiment, and should not be construed to limit the sequence of operations only to the illustrated order. Instead, some operations may be performed in different orders, and/or some operations may be performed in parallel.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

An embodiment of a thermal increase system includes a capacitor structure that includes a capacitor dielectric that includes a cavity for containing a load, and first and second capacitor plates. The first capacitor plate is an electrode disposed in the cavity. The system includes a self-oscillator circuit that includes a resonant circuit configured to produce a radio frequency (RF) signal at an output frequency corresponding to a resonant frequency of the resonant circuit. The resonant circuit includes the capacitor structure.

In an example, the resonant circuit further includes an inductor. A first terminal of the inductor is connected directly to the first capacitor plate. In an example, the thermal increase system further comprises a containment structure containing the cavity. At least a portion of the containment structure forms the second capacitor plate of the capacitor structure. In an example, the first capacitor plate of the capacitor structure is coupled to a first terminal of the inductor, and the second capacitor plate of the capacitor structure is coupled to a ground node. In an example, the resonant circuit includes a second capacitor. A first terminal of the second capacitor is coupled to the inductor, and a second terminal of the second capacitor is coupled to the ground node. In an example, the thermal increase system further comprises a transformer with first and second windings. The first capacitor plate of the capacitor structure is electrically coupled to a first terminal of the first winding.

The second capacitor plate of the capacitor structure is electrically coupled to a second terminal of the first winding. The inductor is electrically coupled to the second winding of the transformer. In an example, a winding ratio of the transformer is one to one. In an example, the thermal increase system further comprises a pulse-width modulated power supply connected to the self-oscillator circuit. A duty cycle of the pulse-width modulated power supply is at least partially determined by a type of the load, a weight of the load, or a temperature of the load.

In another embodiment, a thermal increase system includes a cavity, a first electrode disposed in the cavity, a second electrode disposed in the cavity, and a self-oscillator circuit that produces a radio frequency signal that is converted into electromagnetic energy that is radiated into the cavity by the first and second electrodes. The self-oscillating circuit includes the first electrode and the second electrode. In an example, the first electrode is a first plate in a capacitor structure, the second electrode is a second plate in the capacitor structure, the cavity and a load contained within the cavity is a capacitor dielectric of the capacitor structure, and a resonant frequency of the self-oscillator circuit is at least partially determined by a capacitance value of the capacitor structure. In an example, the self-oscillator circuit includes an inductor, and the system further comprises a transformer. The first and second plates of the capacitor structure are electrically coupled to a first winding of the transformer, and the inductor is electrically coupled to a second winding of the transformer. In an example, a winding ratio of the transformer is one to one. In an example, the system further comprises a pulse-width modulated power supply connected to the self-oscillator circuit. A duty cycle of the pulse-width modulated power supply is at least partially determined by a type of the load, a weight of the load, or a temperature of the load. In an example, the radio frequency signal has a frequency range of 10 Hertz to 100 Megahertz.

In another embodiment, a method of operating a thermal increase system includes supplying, by a power supply, an electrical signal to a self-oscillator circuit that includes a resonant circuit to cause the self-oscillator circuit to produce a radio frequency (RF) signal at an output frequency corresponding to a resonant frequency of the resonant circuit. The resonant circuit includes a capacitor structure. The capacitor structure includes a capacitor dielectric that includes a cavity for containing a load, and first and second capacitor plates. The first capacitor plate is an electrode disposed in the cavity. The method includes detecting an exit condition and causing the power supply to stop supplying the electrical signal to the self-oscillator circuit.

In an example, the resonant circuit further includes an inductor and a first terminal of the inductor is connected directly to the first capacitor plate. In an example, the power supply includes a pulse-width modulated power supply connected to the self-oscillator circuit, and supplying the electrical signal includes setting a duty cycle of the pulse-width modulated power supply to a value at least partially determined by a type of the load, a weight of the load, or a temperature of the load. In an example, the cavity is contained within a containment structure and at least a portion of the containment structure forms the second capacitor plate of the capacitor structure. In an example, the resonant circuit further includes an inductor and the first capacitor plate of the capacitor structure is electrically coupled to a first terminal of a first winding of a transformer, the second capacitor plate of the capacitor structure is electrically coupled to a second terminal of the first winding, and the inductor is electrically coupled to a second winding of the transformer. In an example, a winding ratio of the transformer is one to one.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A thermal increase system, comprising:
    a capacitor structure that includes a capacitor dielectric that includes a cavity for containing a load, and first and second capacitor plates, wherein the first capacitor plate is an electrode disposed in the cavity; and
    a self-oscillator circuit that includes a resonant circuit configured to produce a radio frequency (RF) signal at an output frequency corresponding to a resonant frequency of the resonant circuit, wherein the resonant circuit includes:
    the capacitor structure,
    an inductor, wherein a first terminal of the inductor is electrically coupled directly to the first capacitor plate, and
    a second capacitor, wherein a first terminal of the second capacitor is electrically coupled to a second terminal of the inductor, and a second terminal of the second capacitor is electrically coupled to the ground node.

2. The thermal increase system of claim 1, further comprising a containment structure containing the cavity, and wherein at least a portion of the containment structure forms the second capacitor plate of the capacitor structure.

3. The thermal increase system of claim 2, wherein the second capacitor plate of the capacitor structure is coupled to a ground node.

4. The thermal increase system of claim 1, further comprising a transformer with first and second windings, wherein the first capacitor plate of the capacitor structure is electrically coupled to a first terminal of the first winding, the second capacitor plate of the capacitor structure is electrically coupled to a second terminal of the first winding.

5. The thermal increase system of claim 4, wherein a winding ratio of the transformer is one to one.

6. The thermal increase system of claim 1, further comprising a pulse-width modulated power supply connected to the self-oscillator circuit, and wherein a duty cycle of the pulse-width modulated power supply is at least partially determined by a type of the load, a weight of the load, or a temperature of the load.

7. A thermal increase system, comprising:
    a cavity;
    a first electrode disposed in the cavity;
    a second electrode disposed in the cavity;
    a self-oscillator circuit configured to produce a radio frequency signal that is converted into electromagnetic energy that is radiated into the cavity by the first and second electrodes, the self-oscillating circuit including:

the first electrode and the second electrode, and an inductor; and a transformer, wherein the first electrode and the second electrode are electrically coupled to a first winding of the transformer, a first terminal of the inductor is electrically coupled directly to a second winding of the transformer, and a second terminal of the inductor is electrically coupled to a control terminal of a transistor through a direct-current blocking capacitor.

8. The system of claim 7, wherein the first electrode is a first plate in a capacitor structure, the second electrode is a second plate in the capacitor structure, the cavity and a load contained within the cavity is a capacitor dielectric of the capacitor structure, and a resonant frequency of the self-oscillator circuit is at least partially determined by a capacitance value of the capacitor structure.

9. The system of claim 7, wherein a winding ratio of the transformer is one to one.

10. The system of claim 7, further comprising a pulse-width modulated power supply connected to the self-oscillator circuit, and wherein a duty cycle of the pulse-width modulated power supply is at least partially determined by a type of the load, a weight of the load, or a temperature of the load.

11. The system of claim 7, wherein the radio frequency signal has a frequency range of 10 Hertz to 100 Megahertz.

12. A method of operating a thermal increase system, the method comprising:

supplying, by a power supply, an electrical signal to a self-oscillator circuit that includes a resonant circuit to cause the self-oscillator circuit to produce a radio frequency (RF) signal at an output frequency corresponding to a resonant frequency of the resonant circuit, wherein the resonant circuit includes a capacitor structure, the capacitor structure including a capacitor dielectric that includes a cavity for containing a load, and first and second capacitor plates, wherein the first capacitor plate is an electrode disposed in the cavity, wherein the resonant circuit further includes an inductor and the first capacitor plate of the capacitor structure is electrically coupled to a first terminal of a first winding of a transformer, the second capacitor plate of the capacitor structure is electrically coupled to a second terminal of the first winding, a first terminal of the inductor is electrically coupled to a second winding of the transformer, and a second terminal of the inductor is electrically coupled to a control terminal of a transistor through a direct-current blocking capacitor;

detecting an exit condition; and causing the power supply to stop supplying the electrical signal to the self-oscillator circuit.

13. The method of claim 12, wherein the power supply includes a pulse-width modulated power supply connected to the self-oscillator circuit, and supplying the electrical signal includes setting a duty cycle of the pulse-width modulated power supply to a value at least partially determined by a type of the load, a weight of the load, or a temperature of the load.

14. The method of claim 12, wherein the cavity is contained within a containment structure and at least a portion of the containment structure forms the second capacitor plate of the capacitor structure.

15. The method of claim 12, wherein a winding ratio of the transformer is one to one.

* * * * *